(12) United States Patent
Van Humbeck et al.

(10) Patent No.: US 9,987,583 B2
(45) Date of Patent: Jun. 5, 2018

(54) POLYMERS FUNCTIONALIZED WITH BRøNSTED ACID GROUPS

(71) Applicant: THE REGENTS OF THE UNIVERSITY OF CALIFORNIA, Oakland, CA (US)

(72) Inventors: Jeffrey Van Humbeck, Watertown, MA (US); Jeffrey R. Long, Oakland, CA (US); Thomas M. McDonald, Berkeley, CA (US); Gokhan Barin, Albany, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days. days.

(21) Appl. No.: 15/038,286

(22) PCT Filed: Nov. 21, 2014

(86) PCT No.: PCT/US2014/066791
§ 371 (c)(1),
(2) Date: May 20, 2016

(87) PCT Pub. No.: WO2015/077548
PCT Pub. Date: May 28, 2015

(65) Prior Publication Data
US 2016/0288041 A1    Oct. 6, 2016

Related U.S. Application Data

(60) Provisional application No. 61/907,967, filed on Nov. 22, 2013.

(51) Int. Cl.
*B01D 53/02* (2006.01)
*B01J 20/22* (2006.01)
(Continued)

(52) U.S. Cl.
CPC ............ *B01D 53/02* (2013.01); *B01J 20/226* (2013.01); *B01J 20/261* (2013.01); *B01J 20/264* (2013.01);
(Continued)

(58) Field of Classification Search
CPC ......... C08G 61/02; C08G 61/08; C08G 61/10
(Continued)

(56) References Cited

U.S. PATENT DOCUMENTS

2008/0227634 A1    9/2008 Muller et al.
2009/0157020 A1    6/2009 Shi et al.
(Continued)

OTHER PUBLICATIONS

"Tetraphenylethylene-based Fluorescent Porous Organic Polymers: Preparation, Gas Sorption Properties, and Photoluminescence Properties" authored by Chen et al. and published in the Journal of Materials Chemistry (2011) 21, 13554.*
(Continued)

*Primary Examiner* — Marc S Zimmer
(74) *Attorney, Agent, or Firm* — Morgan, Lewis & Bockius LLP; Jeffry S. Mann

(57) ABSTRACT

Porous aromatic framework polymers functionalized with Brønsted acid moieties are prepared by polymerization of a three-dimensional organic aryl or heteroaryl monomer and its copolymerization with a second aryl or heteroaryl monomer functionalized with one or more Brønsted acid moiety. The polymers are characterized by a stable three-dimensional structure, which, in exemplary embodiments, includes interpenetrating subunits within one or more domain of the bulk polymer structure. The polymers are of use in methods of adsorbing ammonia and amines and in devices and systems configured for this purpose.

11 Claims, 24 Drawing Sheets

(51) Int. Cl.
  *B01J 20/26* (2006.01)
  *B01J 20/34* (2006.01)
  *C08G 61/10* (2006.01)
  *C08G 77/00* (2006.01)

(52) U.S. Cl.
  CPC ....... *B01J 20/3425* (2013.01); *B01J 20/3483* (2013.01); *B01J 20/3491* (2013.01); *C08G 61/10* (2013.01); *C08G 77/00* (2013.01); *B01D 2253/202* (2013.01); *B01D 2257/406* (2013.01); *C08G 2261/143* (2013.01); *C08G 2261/1426* (2013.01); *C08G 2261/1452* (2013.01); *C08G 2261/312* (2013.01); *C08G 2261/72* (2013.01); *C08G 2261/80* (2013.01)

(58) Field of Classification Search
  USPC .................................................. 528/396, 397
  See application file for complete search history.

(56) References Cited

U.S. PATENT DOCUMENTS

2010/0286022 A1 11/2010 Yaghi et al.
2012/0270731 A1 10/2012 Gaab et al.

OTHER PUBLICATIONS

"Sulfonate-Grafted Porous Polymer Networks for Preferential CO2 Adsorption at Low Pressure" authored by Lu et al. and published in JACS (2011) 133, 18126-18129.*
"Exceptional Ammonia Uptake by a Covalent Organic Framework" authored by Doonan et al. and published in Nature Chemistry (2010) 2, 235-238.*
Ammonia Capture in Porous Organic Polymers Densely Functionalized with Bronsted Acid Groups authored by Humbeck et al. and published in JACS (2014) 136, 2432-2440.*
"Spiro(fluorene-9,9'-xanthene)-Based Porous Organic Polymers: Preparation, Porositym and Exceptional Hydrogen Uptake at Low Pressure" authored by Chen et al. and published in Macromolecules (2011) 44, 7987-7993.*
Ben, et al., Chem., Int. Ed. 2009, 48:9457, (Angewandte).
Cavka, et al., J. Am. Chem. Soc. 2008, 130:13850.
Chen et al., J. Mater. Chem. 2011, 21: 13554.
Danon, et al., Chem. C 2011, 115:11540, (J Phys.Chem C).
Das, et al., Microporous Mesoporous Mater. 2013, 174:74.
Demessence, et al., J. Am. Chem. Soc. 2009, 131:8784.
Didas, et al., ChemSusChem 2012, 5:2058.
Doonan, et al., Nature Chem. 2010, 2:235.
Furukawa, et al., Science 2010, 329:424.
Getman, et al., Chem. Rev. 2012, 112:703.
Glover, et al., Chem. Eng. Sci. 2011, 66:163.
Goeppert, et al., J. Am. Chem. Soc. 2011, 133:20164.
Helminen, et al., J. Chem. Eng. Data 2001, 46:391.
Ishiyama, et al., J. Org. Chem. 1995, 60:7508.
Jing, et al., Microporous Mesoporous Mater. 2013, 165:92.
Kitajima, et al., IEEE Trans. Semicond. Manuf. 1997, 10:267.
Kinzel, et al., J. Am. Chem. Soc. 2010, 132:14073.
Lamba, et al., J. Am. Chem. Soc. 1994, 116, 11723.
Li, et al., Chem. Rev. 2012,112:869.
Lin, et al., Aerosol Air Qual. Res. 2010, 10:245.
Lu, et al., Chem. Mater. 2010, 22, 5964.
Lu, et al., J. Am. Chem. Soc. 2011, 133:18126.
Lu, et al., Chem., Int. Ed. 2012, 51:7480, (Angewandte).
MacDonald, et al., Chem. Mater. 1993, 5:348.
McDonald, et al., Chem. Sci. 2011, 2:2022.
McDonald, et al., J. Am. Chem. Soc. 2012, 134:7056.
Merino, et al., A. Chem. Mater. 2013, 25:981.
Morris, et al., Inorg. Chem. 2011, 50:6853.
O'Keeffe, et al., Chem. Rev. 2012, 112:675.
Pangborn, et al., J. Organometallics 1996, 15, 1518.
Peterson, et al., Porous Mater. 2012, 19:261.
Petit, et al., J. Adv. Funct. Mater. 2010, 20:111.
Petit, et al., J. Phys. Chem. C 2009, 113:3800.
Petit, et al., Carbon 2010, 48:654.
Petit, et al., J. Microporous Mesoporous Mater. 2008, 114:137.
Planas, et al., J. Am. Chem. Soc. 2013, 135:7402.
Rose, et al., Chem. Commun. 2008, 2462.
Rose, et al., Soft Matter 2010, 6:3918.
Saha, et al., Colloid Interface Sci. 2010, 348:615.
Spanopoulos, et al., Colloid Interface Sci. 2010, 348:615.
Stöckel, et al., Chem. Commun. 2009, 212.
Suh, et al., Chem. Rev. 2012, 112:782.
Sumida, et al., Chem. Rev. 2012, 112:724.
Trofimov, B. A., Sulfur Reports 1992, 11:207.
Van Humbeck et al., J. Am. Chem. Soc., 2014, 126(6), 2432-2440.
Wang, et al., J. Am. Chem. Soc. 2011, 133:13445.
Weston, et al., Chem. Commun. 2013, 49:2995.
Yao, et al., J. M. Macromolecules 1999, 32, 2455.
Yanai, et al., Nature Mater. 2011, 10:787.
Zhang, et al., Chem., Int. Ed. 2012, 52:1432-1436, (Angewandte).

* cited by examiner

<10 ppb NH₃
Constant
feature width

>50 ppb NH₃
'T-top'
features

POLYMERS FUNCTIONALIZED WITH BRøNSTED ACID GROUPS

CROSS-REFERENCE TO RELATED APPLICATIONS

This application is a 371 U.S. National Phase application of PCT International Application No. PCT/US2014/066791 filed Nov. 21, 2014 which claims, under 35 USC 119(e), the benefit of U.S. Provisional Application No. 61/907,967 filed Nov. 22, 2013, which are incorporated herein by reference in their entireties for all purposes.

STATEMENT OF GOVERNMENT RIGHTS

This invention was made with Government support under Grant Number DE-SC0001015 awarded by the Center for Gas Separations Relevant to Clean Energy Technologies, an Energy Frontier Research Center funded by the U.S. Department of Energy, Office of Science, Office of Basic Energy Sciences. The Government has certain rights in the invention.

FIELD OF THE INVENTION

The present application relates to the fields of chemistry and material science. More particularly, disclosed herein are multi-dimensional networks that can include recurring units of one or more structure, and methods for synthesizing the same. Also disclosed herein are methods of utilizing the networks described herein for various uses.

BACKGROUND OF THE INVENTION

The adsorption of contaminants that are present in vanishingly low concentration—parts per million or below—presents a significant technical challenge in both environmental and industrial settings. To achieve meaningful adsorption capacity, an extremely high enthalpy of adsorption ($\Delta H_{ads}$) is required. This energetic requirement typically lies well outside the range of physical adsorption processes, and will instead require the development of materials that interact chemically with the analyte of interest. Noteworthy progress has been achieved in the selective adsorption of 390-400 ppm carbon dioxide, as a first step towards its direct capture from air (Goeppert, et al., *J. Am. Chem. Soc.* 2011, 133:20164; McDonald, et al., *J. Am. Chem. Soc.* 2012, 134:7056; and Didas, et al., *ChemSusChem* 2012, 5:2058), and presents an interesting conceptual approach (Demessence, et al., *J. Am. Chem. Soc.* 2009, 131:8784; McDonald, et al., *Chem. Sci.* 2011, 2:2022; Lu, et al., *Chem., Int. Ed.* 2012, 51:7480; and Das, et al., *Microporous Mesoporous Mater.* 2013, 174:74). Appropriate adsorption enthalpies are achieved in these cases through multiple chemical interactions: initial interaction of a basic amine with the electrophilic carbon of $CO_2$ yields a carbamic acid, which is further stabilized through either full proton transfer to yield an ammonium carbamate ion pair (Danon, et al., *Chem. C* 2011, 115:11540), or through hydrogen bonding interactions (FIG. 2A) (Planas, et al., *J. Am. Chem. Soc.* 2013, 135:7402). A similar approach can be envisioned, whereby multiple acidic sites located in close proximity result in the strong adsorption of Lewis basic pollutants (FIG. 2B).

Basic gases—such as ammonia—can lead to significant environmental and industrial concerns at similarly small concentrations. With regards to human health, ammonia itself has a recommended CAL-OSHA permissible exposure limit of only 25 ppm, which can be encountered in numerous industrial settings (http://www.dir.ca.gov/title8/5155table_ac1.html, CAL/OSHA. Acessed on Oct. 3, 2013). Highly toxic amines have even more stringent safety limits (e.g., diethanolamine, 0.46 ppm). In perhaps the most extreme example, volatile organic amines can disrupt photolithography at only tens of parts-per-billion concentration, resulting in characteristic 'T-top' channel features that render the resulting silicon wafer useless (FIG. 2C) (MacDonald, et al., *Chem. Mater.* 1993, 5:348; and Lin, et al., *Aerosol Air Qual. Res.* 2010, 10:245). As integrated circuits with narrower feature sizes are pursued, air purity requirements will become even more stringent (Kitajima, et al., *IEEE Trans. Semicond. Manuf.* 1997, 10:267). Outside of this specific application, ammonia adsorption can also serve as the first model for a generic acid-base interaction, taking the place of important but difficult to handle analytes such as the V-series of nerve agents (e.g., VX 1, FIG. 2D).

Currently, dense inorganic materials and unstructured polymers are commonly used technologies for the absorption of ammonia and amines. For transportation applications, simple salts such as $MgCl_2$ are used, which absorb ammonia to produce coordination complexes of the type: $Mg(NH_3)_xCl_2$, where x=1-6. While this material has a gravimetric capacity that will be difficult, if not impossible, to match, significant volume changes during loading and unloading, and the requirement for significant heat exchange during cycling, represent possible avenues for improvement.

Over the past fifteen years, metal-organic frameworks (MOFs) have demonstrated their utility in numerous applications, including gas storage, molecular separations, sensing, and size-selective catalysis (O'Keeffe, et al., *Chem. Rev.* 2012, 112:675; Getman, et al., *Chem. Rev.* 2012, 112:703; Sumida, et al., *Chem. Rev.* 2012, 112:724; Suh, et al., *Chem. Rev.* 2012, 112:782; Li, et al., *Chem. Rev.* 2012, 112:869; Wang, et al., *J. Am. Chem. Soc.* 2011, 133:13445; and Yanai, et al., *Nature Mater.* 2011, 10:787). Some preliminary investigations into the use of these materials for ammonia adsorption have also been conducted. The overwhelming majority of these examples use Lewis acidic framework sites to increase the strength of adsorption for $NH_3$. In materials such as MOF-74, exposed metal cations provide the desired adsorption sites (Glover, et al., *Chem. Eng. Sci.* 2011, 66:163). In related materials known as covalent organic frameworks (COFs), it has been demonstrated that three-coordinate boron centers can behave in a similar Lewis-acidic fashion, with the framework generated from hexahydroxytriphenylene and biphenyldiboronic acid (COF-10) displaying high uptake at moderate pressure (Doonan, et al., *Nature Chem.* 2010, 2:235).

In the context of MOFs, the use of Brønsted acidic centers for the adsorption of ammonia has been explored to a much lesser degree. Trikalitis reported a MOF-205 (Furukawa, et al., *Science* 2010, 329:424) analog containing free phenolic —OH groups, which demonstrated excellent low and moderate pressure ammonia capacity (Spanopoulos, et al., *Colloid Interface Sci.* 2010, 348:615). However, the basic zinc acetate-type structure was not stable to ammonia exposure, with framework collapse suggested by powder X-ray diffraction and gas adsorption experiments, in line with previous observation made on analogous zinc-based materials (MOF-5 and MOF-177) (Saha, et al., *Colloid Interface Sci.* 2010, 348:615; and Petit, et al., *J. Adv. Funct. Mater.* 2010, 20:111). In an effort to generate ammonia adsorbents that would be stable, and therefore potentially reusable, Yaghi investigated a zirconium-based UiO-66 analog (Cavka, et al., *J. Am. Chem. Soc.* 2008, 130:13850) featuring anilinium cations as the Brønsted acid source (Morris, et al., *Inorg. Chem.* 2011, 50:6853). Although only one-third of the available aniline sites in the material had been protonated, a meaningful increase in NH₃ adsorption was noted, and the framework survived exposure up to 1 bar of pressure.

Recently, porous aromatic polymers featuring a diamondoid-type structure have been introduced as 'element-organic frameworks' (e.g., EOF-1) (Rose, et al., *Chem. Commun.* 2008, 2462), 'porous aromatic frameworks' (e.g., PAF-1) (Ben, et al., *Chem., Int. Ed.* 2009, 48:9457), and 'poly(aryleneethynylene) networks' (e.g., PAE-E1) (Stockel, et al., *Chem. Commun.* 2009, 212), with initial investigations on ammonia capture using isolated metal catechol (Weston, et al., *Chem. Commun.* 2013, 49:2995) and polyimide (Peterson, et al., *Porous Mater.* 2012, 19:261) functional groups reported.

Porous aromatic frameworks have attractive features, and a polymer based on this type of framework that was able to adsorb ammonia and/or amines would represent a significant advance in the art concerned with removing these types of toxic substances from the ambient atmosphere. Through provision of a novel PAF in which Brønsted acid moieties are incorporated into this framework, the present invention satisfies this and other needs.

SUMMARY OF THE INVENTION

In exemplary embodiments, the present invention provides a new class of highly porous aromatic covalent framework (PAF) polymers, which are comparable to zeolites and metal-organic-framework (MOF) materials in terms of their porosity. An exemplary PAF of the invention interacts with ammonia and/or amines in a manner that efficiently faciliates the removal of these substances from the ambient environment in which the PAF is deployed.

Exemplary PAF polymers of the present invention are characterized by a rigid three-dimensional framework mainly comprised of aromatic rings. Exemplary frameworks are built up by polymerization of one monomer or copolymerization of more than one monomer. Typical reactions are C—C coupling reactions or addition reactions under ring formation conditions. Exemplary PAF polymers show water and temperature resistant behavior.

In various embodiments, the porous aromatic covalent framework polymer is characterized in that the polymer comprises at least a first aryl or heteroaryl monomer unit and at least a second aryl or heteroaryl monomer unit. The first and second monomer units have different structures. Exemplary aryl or heteroaryl ring components of the first and second monomer are selected from phenyl, naphthyl, biphenyl, pyridyl, pyrimidinyl, pyridazinyl, pyrazinyl and triazinyl. The aryl and heteroaryl rings of the first monomer and the second monomer are independently selected, and they are optionally substituted at positions other than those positions through which polymerization to form the framework occurs.

In an exemplary embodiment, the invention provides an active porous aromatic framework polymer comprising a first three-dimensional monomer according to Formula I:

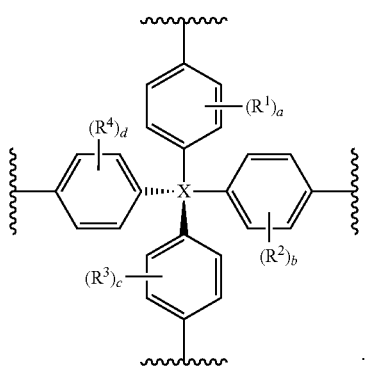

In Formula I, X is selected from C, Si, and a three-dimensional polycyclic alkyl or heteroalkyl moiety, e.g., adamantane. The symbols $R^1$, $R^2$, $R^3$ and $R^4$ independently represent moieties selected from H, substituted or unsubstituted alkyl, substituted or unsubstituted heteroalkyl, substituted or unsubstituted aryl, substituted or unsubstituted heteroaryl, halogen, CN, $CF_3$, acyl, $-SO_2NR^6R^7$, $-NR^6R^7$, $-OR^6$, $-S(O)_2R^6$, $-C(O)R^6$, $-COOR^6$, $-CONR^6R^7$, $-S(O)_2OR^6$, $-OC(O)R^6$, $-C(O)NR^6R^7$, $-NR^6C(O)R^7$, $NR^6C(O)NR^7R^8$, $C(NR^6)R^7$, $-NR^6SO_2R^7$, $-NO_2$, and $-P(O)(OR^6)(OR^7)$. Two or more of $R^1$, $R^2$, $R^3$, and $R^4$, together with the atoms to which they are bonded, are optionally joined to form a ring system which is a member selected from substituted or unsubstituted cycloalkyl, substituted or unsubstituted heterocycloalkyl, substituted or unsubstituted aryl and substituted or unsubstituted heteroaryl. Exemplary substituted alkyl moieties include $-CH_2NR^6R^7$, $-CH_2COOR^6$, $-CH_2S(O)_2OR^6$, and $-CH_2P(O)(OR^6)(OR^7)$.

The symbols $R^6$, $R^7$, and $R^8$ independently represent members selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Two or more of $R^6$, $R^7$, and $R^8$, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl.

The indeces a, b, c and d are members independently selected from the integers 0, 1, 2, 3, and 4, such that when a, b, c, or d is greater than 1, each $R^1$, $R^2$, $R^3$ and $R^4$, respectively, is independently selected.

An exemplary polymer of the invention further comprises a second monomer, which is an aryl or heteroaryl moiety functionalized with one or more Brønsted acid moiety. An exemplary second monomer has a structure according to Formula II

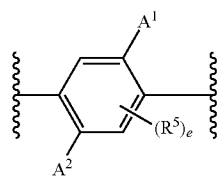

in which $A^1$ and $A^2$ are independently selected Brønsted acid moieties. The symbol $R^5$ represents a member selected from H, substituted or unsubstituted alkyl, substituted or unsubstituted heteroalkyl, substituted or unsubstituted aryl, substituted or unsubstituted heteroaryl, halogen, CN, $CF_3$, acyl, $-SO_2NR^9R^{10}$, $-NR^9R^{10}$, $-OR^9$, $-S(O)_2R^9$, $-C(O)R^9$, $-COOR^9$, $-CONR^9R^{10}$, $-S(O)_2OR^9$, $-OC(O)R^9$, $-C(O)NR^9R^{10}$, $-NR^9C(O)R^{10}$, $NR^9C(O)NR^{10}R^{11}$, $C(NR^9)R^{10}$, $-NR^9SO_2R^{10}$, $-NO_2$, and $-P(O)(OR^9)(OR^{10})$. $R^9$, $R^{10}$, and $R^{11}$ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Two or more of $R^9$, $R^{10}$, and $R^{11}$, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl. Exemplary substituted alkyl moieties include $-CH_2NR^6R^7$, $-CH_2COOR^6$, $-CH_2S(O)_2OR^6$, and $-CH_2P(O)(OR^6)(OR^7)$.

The index e is an integer selected from 0, 1, 2, 3, and 4, such that when e is greater than 1, each $R^5$ is independently selected.

In exemplary embodiments, the invention further provides a device comprising a polymer of the invention. A simple exemplary device is a container having a gas inlet and an outlet. Exemplary devices include, without limitation, a filter or scrubber appropriate for removing ammonia and/or an amine from the ambient atmosphere by adsorbing them with a polymer of the invention. In operation, the device is charged with a polymer of the invention.

Also provided, in various embodiments, is a system incorporating a polymer or a device of the invention. Exemplary systems optionally include one or more components for monitoring the status of the ammonia or/or amine content of the ambient atmosphere, the status of the polymer with respect to its loading with ammonia and/or an amine, and purging the polymer of adsorbed ammonia and/or amine (e.g., a vacuum system, means of increasing the temperature of the polymer or both). Other components of such a system will be apparent to those of skill in the art.

There is also provided in selected embodiments, a method of removing ammonia and/or an amine from the ambient atmosphere. An exemplary method includes placing a polymer of the invention in contact with a selected ambient atmosphere under conditions appropriate for the polymer to adsorb the ammonia and/or amine. The ambient atmosphere can be gaseous or liquid.

As described below, the present invention provides compounds, devices, systems and methods based on Brønsted acidic porous aromatic polymers that display excellent low-pressure ammonia and/or amine adsorption, with multiple functional groups present in a spatial arrangement that leads to cooperative reactivity of these functional groups in the binding of ammonia and/or amines.

BRIEF DESCRIPTION OF THE DRAWINGS

FIG. 2A. Effective strategy for adsorption of carbon dioxide from air. FIG. 2D. Structure of VX nerve gas with conserved basic sites highlighted.

DETAILED DESCRIPTION OF THE INVENTION

I. Introduction

Figure 1:
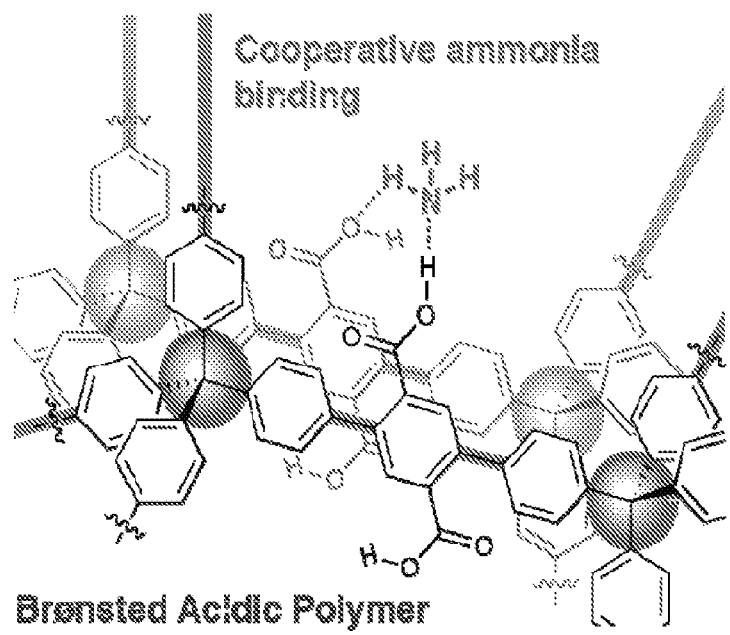
FIG. 1. An exemplary aromatic framework showing cooperative bingding between the Brønsted acid groups of the framework and ammonia.
Figure 2A:
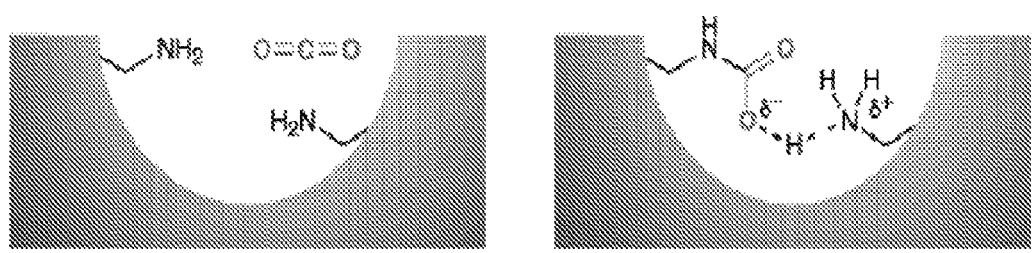
FIG. 2A.
Figure 2B:
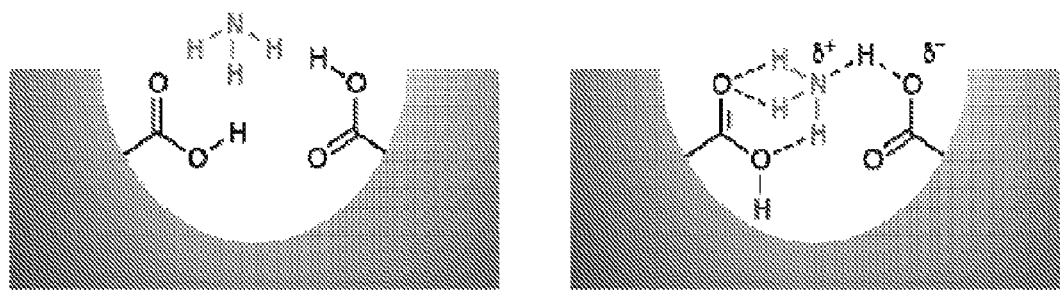
FIG. 2B. Proposed approach to low-pressure adsorption of ammonia.
Figure 2C:
FIG. 2C. 'T-top' photolithography deformation due to volatile organic bases.
Figure 2D:
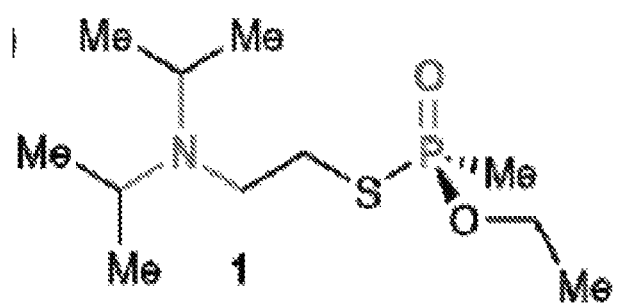
-FIG. 2D. Motivation for the development of low pressure ammonia adsorbents.

Ammonia is one of the most widely used industrial and agricultural chemicals, with annual production above the megaton level. However, this gas is also toxic at tens to hundreds of parts-per-million concentration, and its basic and corrosive nature can interfere in a number of important industrial processes. Thus, there is a need for proper ammonia management under two contrasting pressure regimes. For safe transport of ammonia, materials that can achieve exceptionally high and reversible uptake at moderate pressures (100-1000 mbar) are needed. Additionally, current research focused on the use of ammonia as a chemical reductant that could be used to lower $NO_x$ emissions from automobiles will require a safe method for on-board storage.

For industrial and person protection, conversely, efficient sequestration of dilute ammonia (<1,000 ppm) from ambient air is desired.

The elimination of specific environmental and industrial contaminants, which are hazardous at only part-per-million to part-per-billion concentrations, poses a significant technological challenge. Adsorptive materials designed for such processes must be engendered with an exceptionally high enthalpy of adsorption for the analyte of interest. Rather than relying on a single strong interaction, the use of multiple chemical interactions is an emerging strategy for achieving this requisite physical parameter.

Removal of trace ammonia and amines from ambient air is of the utmost importance for semiconductor manufacturing. The use of chemically-amplified resists in modern photolithography relies on purified air that is free of volatile bases (including ammonia). In this high-value application, levels of volatile base as low as 50 parts-per-billion can interfere in the etching process to the point where the resulting silicon wafer must be disposed of Although activated carbon has a relatively low affinity for ammonia, it has been used traditionally in very large quantities to achieve acceptable air purity. The present invention provides materials and methods for the efficient removal of ammonia and amines in the ambient environment in which these materials and devices incorporating these materials are deployed.

The present invention provides an efficient, catalytic synthesis of framework (e.g., diamondoid) porous aromatic polymers densely functionalized with Brønsted acid moieties, e.g., carboxylic acids. The polymers exhibit excellent pore size distribution, and low-pressure ammonia adsorption. In various embodiments, the polymers of the invention have a structure in which the spatial arrangement of acidic sites allows for cooperative behavior (i.e., two or more Brønsted acids bind to a molecule of ammonia or an amine), which leads to enhanced $NH_3$ and/or amine adsorption Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —$CH_2O$— is intended to also optionally recite —$OCH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated $C_{9-10}$, oleoyl chain or the diunsaturated $C_{9-10,\ 12-13}$ linoeyl chain.

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—OCH$_3$, and CH=CH—N($CH_3$)—$CH_3$. Up to two heteroatoms may be consecutive, such as, for example, —$CH_2$—NH—OCH$_3$ and $CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and $CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$CO_2R'$— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system. Each of the above-named groups is attached to the heteroarene or heteroaryl nucleus directly or through a or a heteroatom (e.g., P, N, O, S, Si, or B); and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R' and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted (C$_1$-C$_6$)alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

As used herein, the term "active porous aromatic polymer" refers to a polymer of the invention that includes one or more Brønsted acid moiety available for binding to a nitrogenous species.

"Nitrogenous species", as this term is used refers to basic nitrogen-containing species such as ammonia and organic amines.

"—COOH" is meant to optionally include —C(O)O$^-$ and —C(O)O$^-$X$^+$, wherein X$^+$ is a cationic counter-ion. Likewise, a substituent having the formula —N(R)(R) is meant to optionally include —N$^+$H(R)(R) and —N$^+$H(R)(R)Y$^-$, wherein Y$^-$ represents an anionic counter-ion. Exemplary polymers of the invention include a protonated carboxylic moiety (COOH). Exemplary polymers of the invention include a deprotonated carboxylic moiety (COO⁻). Various polymers of the invention include both a protonated carboxylic moiety and a deprotonated carboxylic moiety.

The terms "average diameter of the pore", "average diameter of the pore opening" or any grammatical variation thereof, refer to the pore size of a polymer of the invention. Pore sizes can, for example, be determined using nitrogen adsorption isotherms, microscopy or porosimetry.

The pores of the polymer can have any useful size. In a typical polymer, the average pore size is equal to or smaller than the nanoparticles, described herein below. The nominal pore size is typically measured in angstroms ($10^{-10}$ m, Å). In one example, the average diameter of the polymer pores is between about 5 and about 5000 Å. In another example, the volume average diameter of the polymer pores is between about 5 and about 500 Å, between about 5 and about 400 Å, between about 5 and about 300 Å, between about 5 and about 200 Å, between about 5 and about 100 Å, between about 5 and about 80 Å, between about 5 and about 60 Å, between about 5 and about 40 Å, between about 5 and about 20 Å, between about 5 and about 10 Å, between about 2 and about 20 Å, between about 2 and about 10 Å, between about 3 and about 20 Å, between about 3 and about 10 Å, between about 4 and about 20 Å, and between about 4 and about 10 Å.

"Ambient pressure", as used herein, refers to about 1 atmosphere.

"Low pressure" refers to the partial pressure of ammonia or an amine in a gaseous mixture in contact with a polymer of the invention. In exemplary embodiments, "low pressure" refers to a partial pressure of ammonia or amine at or below about 999 ppm in a mixture at ambient pressure.

"Ambient temperature, as used herein, refers to about 25° C.

The term "strong acid", as used herein, refers to acids having a pKa about that of anhydrous chlorosulfonic acid.

The term "strong base, as used herein, refers to bases having a $pK_b$ about that of KOH/DMSO ("superbase").

The term "high temperature", as used herein refers to temperatures above about 100° C., about 150° C. or above about 200° C.

"Stable", as used herein refers to a compound of the invention undergoing minimal degradation when maintained under strong acid, strong base, and/or high temperature for about 24 hours. "Minimal degradation" refers to no more than about 10%, no more than about 8%, no more than about 6%, no more than about 4% or no more than about 2% of a sample undergoing degradation.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition it is understood that, in any compound described herein having one or more double bond(s) generating geometrical isomers that can be defined as E or Z, each double bond may independently be E or Z a mixture thereof. Likewise, it is understood that, in any compound described, all tautomeric forms are also intended to be included.

Below are examples of specific embodiments of the present invention. The examples are offered for illustrative purposes only, and are not intended to limit the scope of the present invention in any way.

III. Compositions

The present invention provides porous aromatic polymers incorporating common Brønsted-acidic functional groups (e.g., —CO₂H) that are difficult to include in MOFs, due to their metal complexation abilities. In exemplary compounds of the invention, these acidic functional group networks are included in the polymer in a density that would be otherwise difficult to achieve. Exemplary polymers of the invention provide the same designed binding environments found in metal-organic frameworks, while affording the exceptional chemical stability more commonly associated with traditional adsorbents such as zeolites and activated carbons.

As a specific realization of this concept, the present invention provides a high-capacity ammonia adsorbent. Exemplary polymers of the invention exhibit a superior stability under extremely basic conditions and are useful for multiple adsorption/desorption cycles and long-term ammonia exposure.

In an exemplary embodiment, the invention provides an active porous aromatic framework polymer comprising a first three-dimensional monomer according to Formula I:

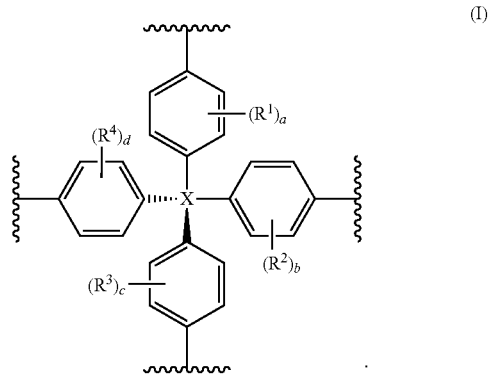

In Formula I, X is selected from C, Si, and a three-dimensional polycyclic alkyl or heteroalky moiety (e.g., adamantane). The symbols $R^1$, $R^2$, $R^3$ and $R^4$ independently represent moieties selected from H, substituted or unsubstituted alkyl, substituted or unsubstituted heteroalkyl, substituted or unsubstituted aryl, substituted or unsubstituted heteroaryl, halogen, CN, CF₃, acyl, —SO₂NR⁶R⁷, —NR⁶R⁷—OR⁶, —S(O)₂R⁶, —C(O)R⁶, —COOR⁶, —CONR⁶R⁷, —S(O)₂OR⁶, —OC(O)R⁶, —C(O)NR⁶R⁷, —NR⁶C(O)R⁷, NR⁶C(O)NR⁷R⁸, C(NR⁶)R⁷, —NR⁶SO₂R⁷, —NO₂, and —P(O)(OR⁶)(OR⁷). Two or more of $R^1$, $R^2$, $R^3$, and $R^4$, together with the atoms to which they are bonded, are optionally joined to form a ring system which is a member selected from substituted or unsubstituted cycloalkyl, substituted or unsubstituted heterocycloalkyl, substituted or unsubstituted aryl and substituted or unsubstituted heteroaryl. Exemplary substituted alkyl moieties include —CH₂NR⁶R⁷, —CH₂COOR⁶, —CH₂S(O)₂OR⁶, and —CH₂P(O)(OR⁶)(OR⁷).

The symbols R⁶, R⁷, and R⁸ independently represent members selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Two or more of R⁶, R⁷, and R⁸, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl.

The indeces a, b, c and d are members independently selected from the integers 0, 1, 2, 3, and 4, such that when a, b, c, or d is greater than 1, each $R^1$, $R^2$, $R^3$ and $R^4$, respectively, is independently selected.

The polymer of the invention further comprises a second monomer, which is an aryl or heteroaryl moiety functionalized with one or more Brønsted acid moiety. An exemplary second monomer has a structure according to Formula II:

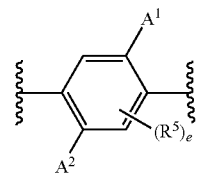
(II)

in which $A^1$ and $A^2$ are independently selected Brønsted acid moieties. The symbol $R^5$ represents a member selected from H, substituted or unsubstituted alkyl, substituted or unsubstituted heteroalkyl, substituted or unsubstituted aryl, substituted or unsubstituted heteroaryl, halogen, CN, $CF_3$, acyl, —$SO_2NR^9R^{10}$, —$NR^9R^{10}$, —$OR^9$, —$S(O)_2R^9$, —$C(O)R^9$, —$COOR^9$, —$CONR^9R^{10}$, —$S(O)_2OR^9$, —$OC(O)R^9$, —$C(O)NR^9R^{10}$, —$NR^9C(O)R^{10}$, $NR^9C(O)NR^{10}R^{11}$, $C(NR^9)R^{10}$, —$NR^9SO_2R^{10}$, —$NO_2$, $P(O)(OR^9)(OR^{10})$. Exemplary substituted alkyl groups include —$CH_2NR^9R^{10}$, —$CH_2COOR^9$, —$CH_2NR^9R^{10}$, —$CH_2S(O)_2OR^9$, —$CH_2P(O)(OR^9)(OR^{10})$. $R^9$, $R^{10}$, and $R^{11}$ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Two or more of $R^9$, $R^{10}$, and $R^{11}$, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl.

The index e is an integer selected from 0, 1, 2, 3, and 4, such that when e is greater than 1, each $R^5$ is independently selected.

In various embodiments, the invention provides a porous aromatic framework polymer that comprises one or more monomer selected from:

(III)

a

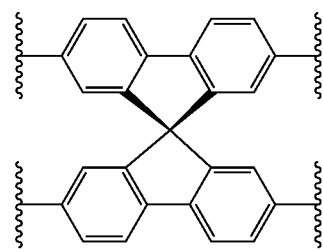

b

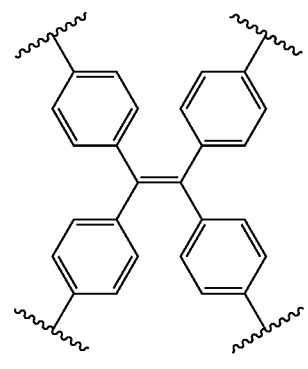

c

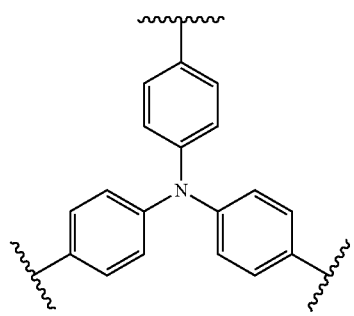

In various embodiments, the polymer of the invention includes one or more monomer selected from Formulae IIIa, IIIb and/or IIIc, and a monomer according to Formula II. The monomers are covalently bound.

In various embodiments, the invention provides a porous aromatic framework polymer having the formula: $_\infty^3[2',5'-(C^1O_2H)terph(C)]$, which features a multiply interpenetrated structure dominated by <6 Å pores, is shown to exhibit an uptake of 17.7 mmol/g at 1 bar, the highest capacity yet demonstrated for a readily recyclable material.

In various embodiments, the Brønsted acid group is a member selected from carboxylic acid, sulfonic acid, phosphonic acid, hydroxyl, and quaternary amine which is covalently bound to the aryl moiety of Formula II.

In an exemplary embodiment, the invention provides a porous aromatic framework polymer having the formula: $_\infty^3[2',5'-(C^9O_2H)terph(C)]$, which includes slightly larger pore sizes than those of $_\infty^3[2',5'-(C^1O_2H)terph(C)]$, and the resulting improvement in uptake kinetics allows for efficient adsorption at low pressure (3.15 mmol/g at 480 ppm).

Exemplary polymers of the invention are efficiently formed by Suzuki polymerization using readily accessible precursors, along with modern catalysts showing high activity and functional group tolerance, will allow for the introduction of diverse binding sites—including those that may be difficult to incorporate in metal-organic frameworks.

Figure 4A:
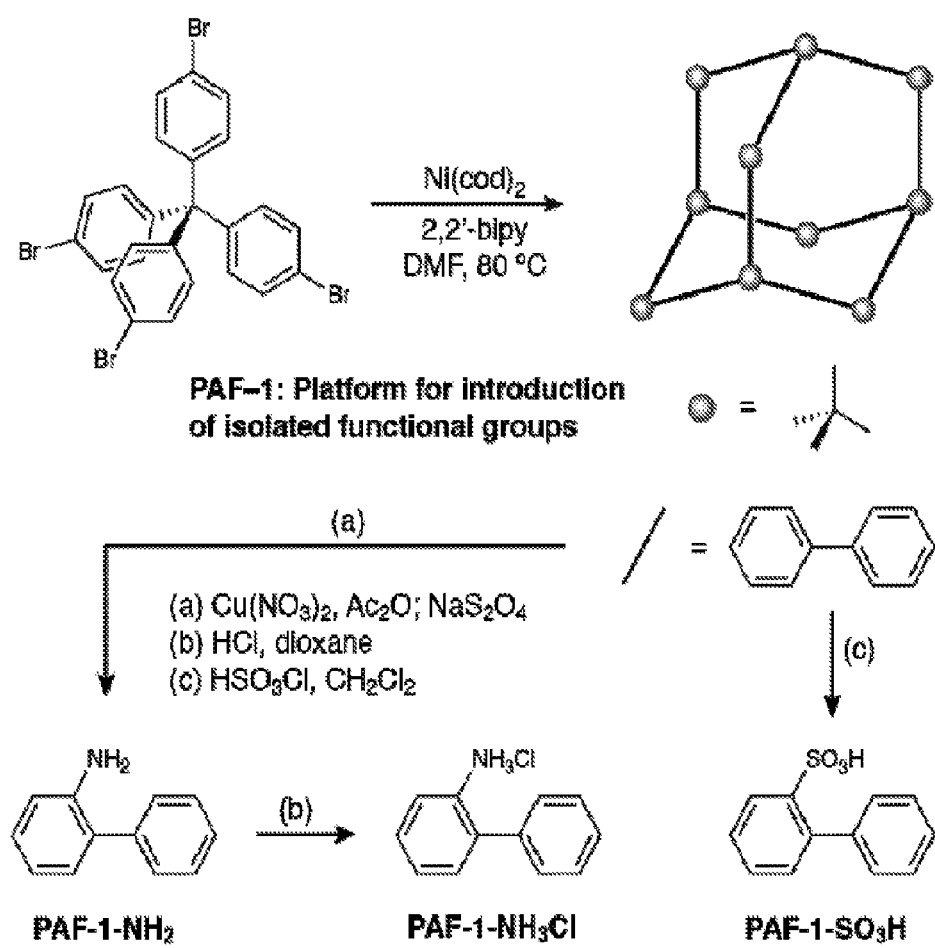
FIG. 4A and FIG. 4B. Synthesis and 77 K nitrogen adsorption characteristics of PAF-1 (□, ■). PAF-1-$NH_2$ (◇, ♦), PAF-1-$NH_3Cl$ (△, ▲), and PAF-1-$SO_3H$ (○, ●). Open circles represent desorption data.

In an exemplary embodiment, the repeating subunit is three-dimensional and has an adamantyl framework structure. FIG. 4A.

Figure 5A:
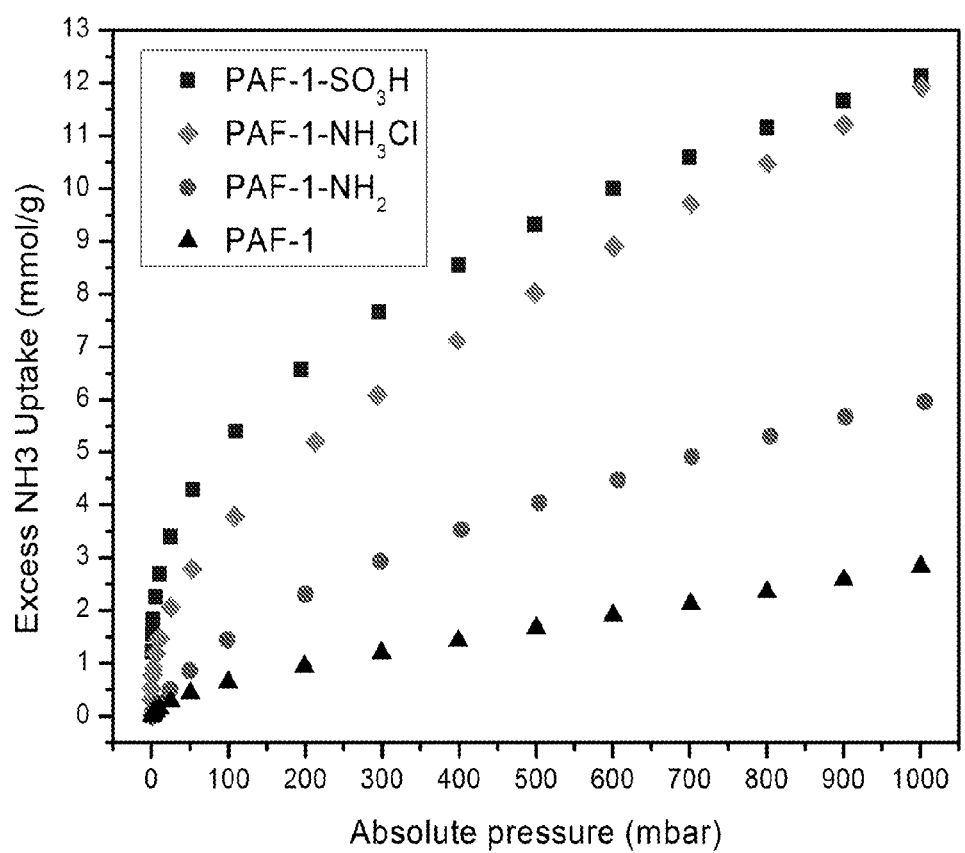
FIG. 5A and FIG. 5B. Room temperature (298 K) ammonia adsorption for PAF-1 (▲), PAF-1-$NH_2$ (●), PAF-1-$NH_3Cl$ (♦), and PAF-1-$SO_3H$ (■).

In FIG. 5A, the ammonia adsorption isotherms for a representative family of porous aromatic polymers with isolated acidic functional groups is presented. PAF-1 is a pure hydrocarbon analog; PAF-1-$NH_2$ contains very weakly acidic aniline groups; PAF-1-$NH_3Cl$ contains moderately acidic anilinium chloride groups; PAF-1-$SO_3H$ contains strongly acidic sulfonic acid groups.

In an exemplary embodiment, the invention provides a polymer of the invention to which a nitrogenous species is bound. The nitrogenous species has the formula:

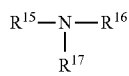

wherein $R^{15}$, $R^{16}$ and $R^{17}$ are independently selected from H, substituted or unsubstituted alkyl, substituted or unsubstituted heteroalkyl, substituted or unsubstituted aryl, substituted or unsubstituted heteroaryl, and substituted or unsubstituted heterocycloalkyl, wherein said species is optionally quaternized by said Brønsted acid moiety.

In various embodiments, as discussed above, two or more Brønsted acid moieties cooperatively bind the nitrogenous species. FIG. 1.

Figure 6A:
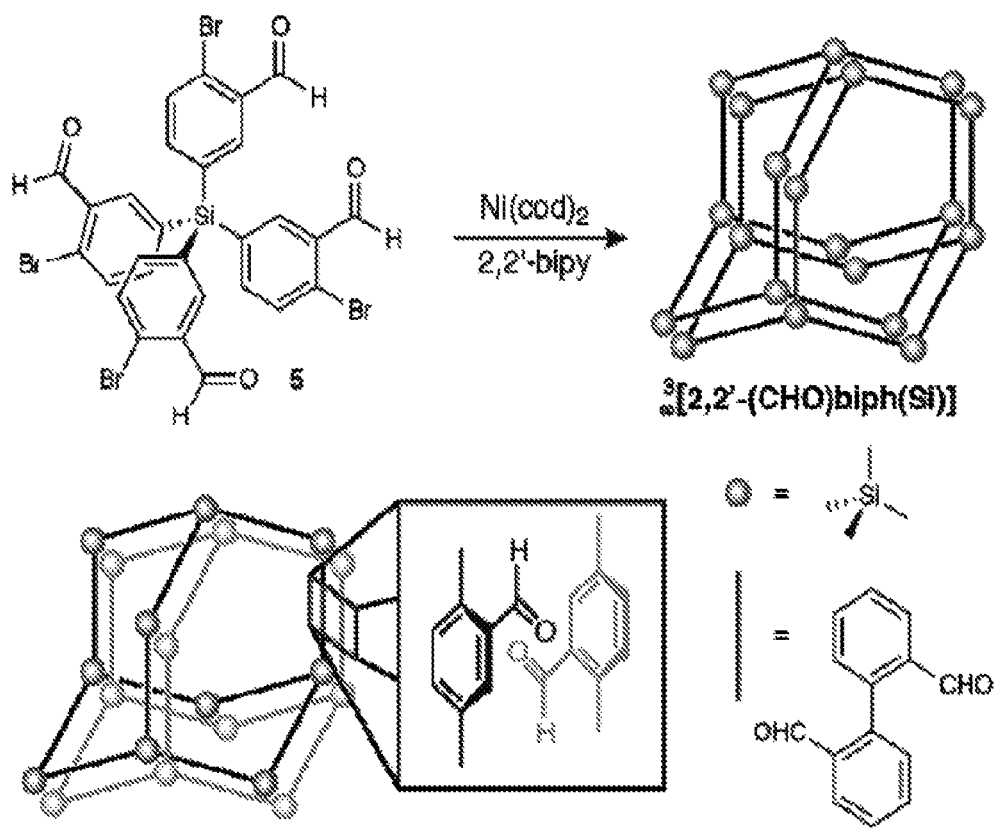
FIG. 6A and FIG. 6B. Polymerization, nitrogen adsorption and pore size distribution for $_\infty^3[2,2'-(CHO)biph(Si)]$.

In an exemplary embodiment, the polymer of the invention includes at least one domain within its bulk structure in which one or more subunit of the domain interpenetrates at least a second subunit of the domain. FIG. 6A. In an exemplary embodiment, the interpenetrating subunits have an adamantyl structure.

Exemplary compositions of the invention display ammonia adsorption characteristics that are unexpected. For example, in FIG. 9A, the ammonia adsorption isotherms for exemplary materials of the invention are presented. These materials feature carboxylic acid functional groups. If relative acidity continued to be the material characteristic that determined adsorption performance, this material would be expected to display ammonia adsorption between that shown for PAF-1-$NH_3$Cl and PAF-1-$SO_3$H. However, this material displays markedly superior performance. Determination of the pore size and surface area of this material by $N_2$ adsorption isotherms gathered at 77 K strongly suggested that interpenetration of individual polymer networks had occurred. While such a geometric feature reduces the surface area of porous materials, it likely also brings acid functional groups on individual polymer networks into close contact, allowing for their cooperative interaction with ammonia, as shown in FIG. 1.

In various embodiments, the polymers of the invention are highly stable under a range of thermal and chemical conditions and they do not undergo significant rearrangement or degradation of their three-dimensional structure when subjected to these conditions. For example, selected polymers of the invention do not undergo significant morphological change on exposure to conditions selected from strong acid, strong base and a combination thereof.

Two particular features of the materials of the invention result in their characteristic stable low-pressure ammonia adsorbing properties. In addition to their high specific surface area, the physicochemical stability of the materials of the invention is especially noteworthy. Exemplary polymers of the invention exhibit pH stability ranging from anhydrous chlorosulfonic acid (Lu, et al., *J. Am. Chem. Soc.* 2011, 133:18126) to KOH/DMSO 'superbase' (Trofimov, B. A., *Sulfur Reports* 1992, 11:207) (vide infra).

The compounds of the invention are stable to exposure to ammonia and amines and are also amenable to a diverse range of post-synthetic chemical transformations including, without limitation, chloromethylation (Lu, et al., *Chem., Int. Ed.* 2012, 51:7480), nitration (Merino, et al.,*A. Chem. Mater.* 2013, 25:981), and sulfonation (Lu, et al., *J. Am. Chem. Soc.* 2011, 133:18126).

IV. Devices and Systems

In addition to the polymers discussed above and in the Examples, the present invention provides devices incorporating the polymers and systems incorporating such devices. In an exemplary embodiment, the device is configured to capture ammonia and/or amines and it comprises a gas inlet, a gas outlet, a chamber for the polymer of the invention in communication with the gas inlet and the gas outlet and a port through which the polymer can be inserted and removed from the device. Other configurations of useful devices incorporating the polymer of the invention will be apparent to those of skill in the art.

In various embodiments, the invention provides a system incorporating a device of the invention. An exemplary system comprises, in addition to the device, a component for placing the device under vacuum, for heating or cooling the device, for monitoring the uptake by the polymer of the ammonia or amine, for monitoring the release by the polymer of adsorbed ammonia or amine. Other systems incorporating a device of the invention will be apparent to those of skill in the art.

In various embodiments, the invention provides porous framework materials that bind to an analyte of interest (e.g., ammonia, amines) and which upon binding to the analyte undergo a detectable change that can be measure by a transducer thereby indicating the presence of an absorbed analyte. For example, the disclosure provides porous frameworks that can be used in any number of sensor modalities comprising different transducers for measuring a detectable signal. Chemically-sensitive resistor, for example, can be used wherein the sensing region comprises a porous framework of the disclosure either alone or in combination with other conductive or non-conductive materials. Such sensors can be used in a sensing array. The change in the electrical resistance of a chemically-sensitive resistor in such a sensing array can be related to the sorption of a molecule of interest to the porous framework.

Other sensor modalities include acoustic wave, capacitance and optical transduction methods. Acoustic wave sensors measure an absorbed material by change in the vibrational frequency of the sensor (e.g., a sensor comprising a porous framework). For instance, an acoustic wave sensor may have a first vibrational frequency in the absence of a bound analyte and a second different frequency in the presence of the bound analyte. Measuring such changes in vibrational frequency can be performed in the methods and compositions of the disclosure wherein the sensor comprises a porous framework and wherein the porous framework changes mass (thus vibrational frequency) when the material binds an analyte.

Similarly, the presence of a bound analyte can be measured optically. In optical transduction modalities the optical properties are measured in the porous material prior to contact with an analyte and then subsequence to contact with the analyte. Light diffusion through a sensor material can be detected or a change in the color of the material may be detected.

Another type of sensor includes, for example, a sensor that undergoes a volume change in response to an analyte species. As the sensors are modulated in size the sensor material changes with respect to mass or optics. For example, the light diffraction indicates the presence or absence of the analyte that causes the sensing material to change. In this embodiment, the sensor material comprises a porous sensor material of the invention that can be specifically functionalized for binding an analyte of interest either reversibly or irreversibly.

Yet another type of sensor includes those wherein the sensors produce a spectral recognition patterns when an analyte is present. In this embodiment the porous sensor material changes in optical properties, whether by density or through a change in emission, excitation or absorbance wavelengths.

Any number of sensor combinations comprising a porous framework of the disclosure or any number of transduction modalities can be used. For example, each individual sensor can provide a signal (e.g., a transduced signal indicative of the presence of an analyte) or a plurality of signals from an array of sensors can be used to identify an analyte of interest in a fluid. The signal transduction mechanism through which the analyte or molecule produces a signal is potentially quite broad. These include arrays of surface acoustic wave devices, quartz crystal micro-balances, dye-coated fiber optics, resistometric, electrochemical, and others modalities readily identifiable to those skilled in the art. Accordingly, transduction mechanisms include, for example optical, electrical, and/or resonance.

By "differentially responsive sensors" is meant any number of sensors comprising a porous framework that respond (e.g., transducer a signal) to the presence or interaction of an analyte with the sensor. Such measurable changes include changes in optical wavelengths, transparency of a sensor, resonance of a sensor, resistance, diffraction of light and/or sound, and other changes easily identified to those skilled in the art.

The diversity of the sensors of the disclosure comprising a porous framework material can be increased by combining the framework with additional material (e.g., conductive polymers, insulators and the like).

The porous materials described herein serve as effective adsorption medium for gas sensing and more particularly ammonia and amines sensing having long term viability and combine two features: (i) a periodic structure for which carbon dioxide uptake and release is fully reversible, and (ii) a flexibility with which chemical functionalization and molecular level fine-tuning can be achieved for optimized uptake capacities.

The analysis of change in sensor composition (e.g., due to binding of an analyte) measured by a change in, for example, resistance, mass or optical properties may be implemented in hardware or software, or a combination of both (e.g., programmable logic arrays and digital signal processors). Unless otherwise specified, the algorithms included as part of the disclosure are not inherently related to any particular computer or other apparatus.

In particular, various general purpose machines may be used with programs written in accordance with the teachings herein, or it may be more convenient to construct more specialized apparatus to perform the operations. However, preferably, the embodiment is implemented in one or more computer programs executing on programmable systems each comprising at least one processor, at least one data storage system (including volatile and non-volatile memory and/or storage elements), at least one input device, and at least one output device. The program code is executed on the processors to perform the functions described herein.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

For example, the computer can be used to measure a signal from the sensor and output an indication of the present of a gas or analyte. In some embodiments, the output may be transmitted to a remote location.

V. The Methods

The invention also provides methods of using the polymers, devices and systems of the invention. In an exemplary embodiment, there is provided a method of scouring a nitrogenous species from the ambient environment. The method comprises: (a) adsorbing the nitrogenous species on the active porous polymer of the invention, forming a porous polymer-bound nitrogenous species. In various embodiments, the method further comprises: (b) subjecting the polymer to a process for desorbing the nitrogenous species from the polymer. Exemplary desorbing processes include, without limitation, application of vacuum to the polymer, heating the polymer and a combination thereof.

In an exemplary embodiment, a nitrogenous species is adsorbed using a method of the invention at ambient pressure, temperature or a combination thereof. In various embodiments, the partial pressure of the nitrogenous species at ambient temperature and pressure is less than about 999 ppm, e.g., less than about 900 ppm, e.g., less than about 700 ppm, e.g., less than about 500 ppm, e.g., less than about 300 ppm, e.g., less than about 100 ppm.

The multi-dimensional networks described herein may be prepared in various ways. General synthetic routes for preparing the compositions of the invention and some examples of starting materials used to synthesize the compositions are described herein. The routes shown and described herein are illustrative only and are not intended, nor are they to be construed, to limit the scope of the claims in any manner whatsoever. Those skilled in the art, in view of the guidance provided herein, will be able to recognize modifications of the disclosed syntheses and to devise alternate routes based on the disclosures herein; all such modifications and alternate routes are within the scope of the claims.

The following examples illustrate embodiments of the invention and are not intended to limit the scope of the compositions of the invention or the methods in which they find use.

EXAMPLES

Example 1

Experimental Section

General Information

All reaction solvents were purified according to the procedure of Grubbs (Pangborn, et al., *J. Organometallics* 1996, 15, 1518), with the exception of DMF, which was used as received (Sigma-Aldrich, catalog number 227056) and carbon tetrachloride, which was used as received (Sigma-Aldrich, catalog number 289116). Solvents for extraction, recrystallization, and filtration were ACS grade, and used without further purification. All reagents were used as received, unless otherwise specified. Tetrakis(4-bromophenyl)methane was synthesized according to the procedure of Bräse and Zhou (Lu, et al., *Chem. Mater.* 2010, 22, 5964). 2,5-dibromoterephthalic acid was synthesized according to the procedure of Tour (Yao, et al., *J. M. Macromolecules* 1999, 32, 2455). PAF-1 was synthesized according to the method of Qiu and Zhu (Ben, et al., *Angew. Chem. Int. Ed.* 2009, 48, 9457). PAF-1-SO$_3$H was synthesized according to the method of Zhou (Lu, et al., *J. Am. Chem. Soc.* 2011, 133, 18126). $^1$H, $^{11}$B, and $^{13}$C NMR spectra were acquired on a Bruker AV 400, Bruker AMX 400, and Bruker AV 600 spectrometers. All synthetic manipulations were performed under inert nitrogen atmosphere, with liquids transferred by syringe technique, unless otherwise indicated. n-Butyllithium was titrated against diphenylacetic acid before use. Gas adsorption data using volumetric methods was collecting using Micromeritics ASAP 2020 and ASAP 2420 gas adsorption analyzers. Isotherms obtained at 77 K were measured using liquid nitrogen baths. Isotherms obtained at 298 K were measured with water circulators to maintain a constant temperature. BET surface areas were calculated from 77 K nitrogen adsorption isotherms. Pore size distributions were calculated with Micromeritics DFT Plus Models Kit (Ver 2.02) assuming slit pore geometries and a carbon surface. Thermal gravimetric analysis (TGA) data was collected at ramp rates of 1° C./min under flowing nitrogen using a TA Instruments TGA Q5000. CHN elemental analyses were performed at the Microanalytical Laboratory of the University of California, Berkeley. Infrared spectra were collected on a Perkin-Ellmen Spectrum 400 FTIR instrument using attenuated total reflectance (ATR) mode.

Synthesis of Organic Polymer Precursors

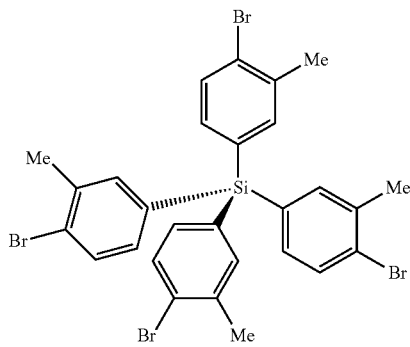

Tetrakis(4-bromo-3-methylphenyl)silane (3). An oven-dried 1000 mL round bottomed flask, cooled under nitrogen, was charged with anhydrous THF (300 mL) and 2-bromo-5-iodotoluene (16 mL, 112 mmol, 4.6 equiv.). The solution was cooled to −78° C. under N$_2$, at which point n-butyllithium (2.3 M in hexanes, 48.5 mL, 112 mmol, 4.6 equiv.) was added dropwise, and the reaction was left to stir at −78° C. for 90 minutes after the addition was complete. At that point, freshly distilled SiCl$_4$ was added (2.8 mL, 24.4 mmol, 1.0 equiv.) dropwise, and the reaction was left to stir for six hours at −78° C. The reaction was quenched by the addition of hydrochloric acid (2N, 20 mL) dropwise, with the reaction still at −78° C. under nitrogen. The reaction was left to warm to room temperature slowly overnight under nitrogen (~12 hours). After a further dilution with water (100 mL) and separation, the aqueous layer was extracted with ethyl acetate (3×75 mL), the combined organic layers were dried over MgSO$_4$, filtered and concentrated in vacuo, resulting in a viscous, clear oil. The clear oil was diluted with chloroform (20 mL), and warmed with a heat gun. Once the solution was near the boiling point of chloroform, absolute ethanol was added with occasional heating to maintain temperature. After the first indications of cloudiness, the solution was allowed to cool overnight in a −30° C. freezer, to yield the desired product as a colorless microcrystalline powder, which was collected by filtration and washed with absolute ethanol (5×25 mL) (12.38 g, 17.5 mmol, 72% yield). $^1$H NMR (400 MHz, CDCl$_3$) ∂7.56 (d, J=7.9 Hz, 4H), 7.32 (s, 1H), 7.15 (d, J=7.8, 4H), 2.38 (s, 12H). $^{13}$C NMR (101 MHz, CDCl$_3$) ∂138.2, 137.7, 135.0, 132.2, 132.2, 127.7, 23.0. IR (solid, ATR) 2918, 1571, 1548, 1468, 1432, 1356, 1206, 1110, 1019, 874, 814, 692, 560, 519, 510 cm$^{-1}$. Elemental analysis for C$_{28}$H$_{24}$Br$_4$Si calculated: 47.49% C; 3.42% H. Found 47.44% C; 3.14% H.

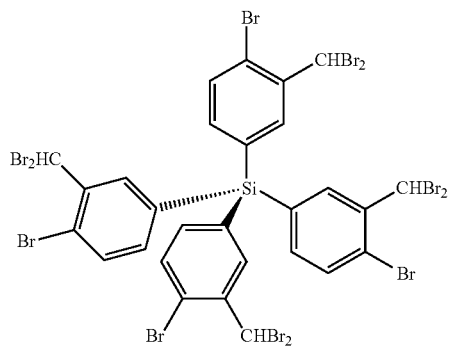

Tetrakis(4-bromo-3-(dibromomethyl)phenyl)silane (4). An oven-dried 250 mL round bottomed flask, cooled under N$_2$, was charged with tetrakis(4-bromo-3-methylphenyl)silane 3 (6.30 g, 8.90 mmol, 1.0 equiv.), benzoyl peroxide (950 mg, 3.9 mmol, 0.44 equiv) and N-bromosuccinimide (19.0 g, 107 mmol, 12 equiv.), degassed carbon tetrachloride (90 mL), and equipped with an oven-dried reflux condenser. The reaction was heated to reflux under N$_2$. After 45, 90, and 135 minutes, a further portion of benzoyl peroxide was added (950 mg, 0.44 equiv.) by brief removal of the reflux condenser, and the reaction was subsequently left to reflux overnight (~12 hours). In the morning, the reaction was filtered to remove precipitated succinimide, which was washed with carbon tetrachloride (2×20 mL). The combined CCl$_4$ filtrate was washed with Na$_2$SO$_3$ (saturated aqueous, 50 mL) and NaOH (1N, 50 mL), then dried over MgSO$_4$, filtered and concentrated in vacuo. The resulting crude solid was purified by recrystallization: it was dissolved in the minimum amount of boiling chloroform, and absolute ethanol was slowly added while maintaining temperature until the first sign of cloudiness. The solution was left in a −30° C. freezer overnight to yield the desired product as a slightly yellow microcrystalline powder, which was collected by filtration and washed with absolute ethanol (4×10 mL) (7.32 g, 5.53 mmol, 62% yield). $^1$H NMR (400 MHz, CDCl$_3$) ∂8.27 (d, J=1.7 Hz, 4H), 7.59 (d, J=8.0 Hz, 4H), 7.25 (dd, J=8.0, 1.7 Hz, 4H), 7.10 (s, 4H). $^{13}$C NMR (101 MHz, CDCl$_3$) ∂140.8, 138.4, 138.0, 132.9, 132.2, 123.1, 39.22. IR (solid, ATR) ∂017, 1702, 1571, 1460, 1369, 1140, 1019, 895, 812, 731, 586, 544 cm$^{-1}$. Elemental analysis calculated for C$_{28}$H$_{16}$Br$_{12}$Si: 25.11% C; 1.20% H. Found 25.13% C; 0.87% H.

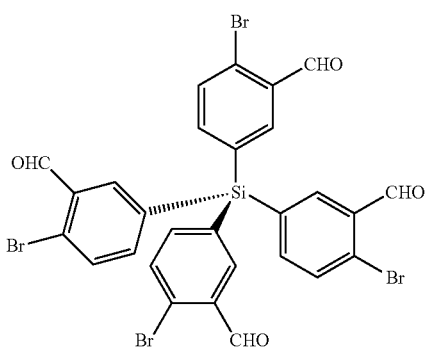

Tetrakis(4-bromo-3-formylphenyl)silane (5). An oven-dried 500 mL round bottomed flask, cooled under $N_2$, was charged with tetrakis(4-bromo-3-(dibromomethyl)phenyl)silane (4) (12.2 g, 9.22 mmol, 1.0 equiv.), degassed DMSO (250 mL), degassed acetic acid (15 mL), degassed water (15 mL), and equipped with a reflux condenser. The solution was heated to 105° C. (oil bath temperature) under nitrogen, and was monitored by TLC. The mono-, di-, tri-, and tetra-hydrolysis products were clearly visible, and the reaction was allowed to proceed until complete conversion to the desired product (typically, 48-72 hours). The reaction was allowed to cool to room temperature, and was quenched by pouring slowly into a 1000 mL Erlenmeyer flask containing saturated aqueous sodium bicarbonate (250 mL). The crude solid resulting was collected by filtration and washed with water (3×50 mL). It was then redissolved in chloroform, and was further washed with pure water (2×50 mL) and saturated aqueous sodium bicarbonate (50 mL). The organic layer was dried over $MgSO_4$, filtered, and diluted with an equivalent volume of ethyl acetate. The organic layer was concentrated to ~20 mL total volume in vacuo, the re-diluted with an additional portion of ethyl acetate (100 mL). This procedure was repeated, with close attention paid to the concentration step, until the product spontaneously precipitated while under vacuum. At this point, solvent removal was stopped, and the flask was transferred to a −30° C. freezer, and left to further precipitate overnight. The solid product was obtained as a slightly yellow powder by filtration, which was further purified by recrystallization from $CHCl_3$/EtOH as described for 4, to yield the desired product as a slightly off-white powder (4.65 g, 6.09 mmol, 66% yield). $^1$H NMR (400 MHz, $CDCl_3$) ∂10.38 (s, 4H), 7.96 (d, J=1.8 Hz, 4H), 7.74 (d, J=8.0 Hz, 4H), 7.50 (dd, J=8.0, 1.8 Hz, 4H). $^{13}$C NMR (101 MHz, $CDCl_3$) ∂191.3, 142.0, 136.9, 134.4, 133.4, 131.2, 130.6. IR (solid, ATR) 2870, 1685, 1568, 1545, 1456, 1382, 1357, 1275, 1261, 1190, 1107, 1017, 897, 826, 718, 642, 554 $cm^{-1}$. Elemental analysis calculated for $C_{28}H_{16}Br_4O_4Si$: 44.01% C; 2.11% H. Found 43.81% C; 2.04% H.

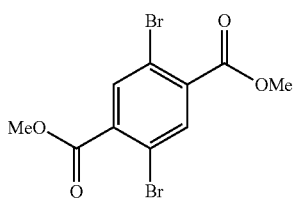 [SMILES: COC(=O)c1cc(Br)c(C(=O)OC)cc1Br]

Dimethyl 2,5-dibromoterephthalate (7). In an oven-dried 100 mL round bottomed flask, equipped with a reflux condenser and cooled under $N_2$, 2,5-dibromoterephthalic acid (1.0 g, 3.09 mmol, 1.0 equiv.) was suspended in anhydrous benzene (12 mL). DMF (1 drop) and oxalyl chloride (780 μL, 9.22 mmol, 3.0 equiv.) were added dropwise, and the solution was heated to reflux under $N_2$. A much larger round bottomed flask than was needed was used, as vigorous bubbling occurred during reaction initiation. The reaction was heated at reflux for 2.5 hours, and was then cooled to room temperature. Benzene was removed in vacuo, and the crude solid was immediately redissolved in anhydrous $CH_2Cl_2$ (15 mL) and cooled to 0° C. under $N_2$. Methanol was added (625 μL, 15.5 mmol, 5.0 equiv.), followed by pyridine (625 μL, 7.73 mmol, 2.5 equiv.) and a spatula tip of 4-DMAP. The reaction was allowed to warm to room temperature overnight (~12 h). Next, it was diluted with ethyl acetate, washed with saturated aqueous sodium bicarbonate (3×20 mL), hydrochloric acid (2N, 20 mL), and pure water (1×20 mL). The combined organic layers were dried over $MgSO_4$, filtered and concentrated in vacuo to yield the pure product as a white solid (968 mg, 2.75 mmol, 89% yield) without the requirement for further purification. The $^1$H NMR spectrum matched that previously reported for this compound (Lamba, et al., *J. Am. Chem. Soc.* 1994, 116, 11723). $^1$H NMR (400 MHz, $CDCl_3$) ∂38.07 (s, 2H), 3.97 (s, 6H).

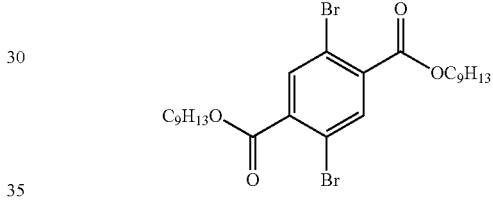

Dinonyl 2,5-dibromoterephthalate (8). In an oven-dried 500 mL round bottomed flask, equipped with a reflux condenser and cooled under $N_2$, 2,5-dibromoterephthalic acid (7.0 g, 21.6 mmol, 1.0 equiv.) was suspended in anhydrous benzene (85 mL). DMF (3 drop) and oxalyl chloride (5.5 mL, 65 mmol, 3.0 equiv.) were added dropwise, and the solution was heated to reflux under $N_2$. A much larger round bottomed flask than was needed was used, as vigorous bubbling occurred during reaction initiation. The reaction was heated at reflux for 2.5 hours, and was then cooled to room temperature. Benzene was removed in vacuo, and the crude solid was immediately redissolved in anhydrous $CH_2Cl_2$ (100 mL) and cooled to 0° C. under $N_2$. 1-nonanol (18.8 mL, 108 mmol, 5 equiv.), pyridine (6.4 mL, 54 mmol, 2.5 equiv.), and 4-DMAP (264 mg, 2.16 mmol, 10 mol %) were added, and the solution was allowed to warm to room temperature slowly overnight (~12 h). Next, it was diluted with ethyl acetate, washed with saturated aqueous sodium bicarbonate (3×50 mL), hydrochloric acid (2 N, 50 mL), and pure water (1×50 mL). The combined organic layers were dried over $MgSO_4$, filtered and concentrated in vacuo, during which, the product spontaneously precipitated as a white solid. The flask was further cooled to −30° C. in a freezer for three hours, and the white solid was collected by filtration, and washed with one small portion of ice-cold ethyl acetate (10 mL). The crude solid was further purified by recrystallization from pure hexanes, to yield the desired product as a white powder (9.85 g, 17.1 mmol, 79% yield). $^1$H NMR (400 MHz, $CDCl_3$) ∂8.02 (s, 2H), 4.35 (t, J=6.7 Hz, 4H), 1.89-1.68 (m, 4H), 1.51-1.12 (m, 24H), 0.98-0.81 (m, 6H). $^{13}$C NMR (101 MHz, $CDCl_3$) ∂164.3, 136.4, 135.8, 120.0, 66.5, 31.8, 29.4, 29.2, 29.2, 28.4, 25.9, 22.6, 14.1. IR (solid, ATR) 2957, 2920, 2850, 1737, 1468, 1279, 1239, 1121, 1063, 943, 901, 773, 717, 601 cm$^{-1}$. Elemental analysis calculated for $C_{26}H_{40}Br_2O_4$: 54.18% C; 6.99% H. Found 54.42% C; 7.25% H.

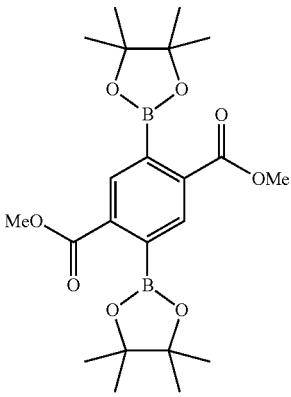 [SMILES: COC(=O)c1cc(B2OC(C)(C)C(C)(C)O2)c(C(=O)OC)cc1B1OC(C)(C)C(C)(C)O1]

Dimethyl 2,5-bis(4,4,5,5-tetramethyl-1,3,2-dioxaborolan-2-yl)terephthalate (9). Dimethyl 2,5-dibromoterephthalate (7) (352 mg, 1.00 mmol, 1.0 equiv.), bis(pinacolato)diboron (635 mg, 2.50 mmol, 2.5 equiv.), oven-dried potassium acetate (245 mg, 2.50 mmol, 2.5 equiv.), and [1,1'-bis(diphenylphosphino)ferrocene]dichloropalladium (II) (73 mg, 0.10 mmol, 10 mol %) were charged in an oven-dried 3-neck round bottomed flask, equipped with a reflux condenser and cooled under $N_2$. The extraneous openings were capped with standard rubber septa. Anhydrous 1,4-dioxane (10 mL) was added, and the suspension was degassed with bubbling nitrogen for ten minutes, before being heated to reflux. The reaction was monitored by TLC, using an expired gas chromatograph column inserted through a septum against positive nitrogen pressure, with the aid of an eighteen gauge syringe needle. Once complete conversion to the desired bis-borylated product was indicated, the reaction was allowed to cool to room temperature, and was transferred to a single-necked round bottom flash with the aid of chloroform. The mixture was cautiously concentrated in vacuo, then was redissolved in pure chloroform (50 mL), which was washed with pure water (25 mL), dried over $MgSO_4$ and suspended over ~1 g activated carbon for two hours, then was filtered and concentrated in vacuo. The crude product obtained was recrystallized from methanol to deliver the desired product as a colorless, microcrystalline solid (272 mg, 0.61 mmol, 61% yield), with NMR spectra matching the literature report (Benin, et al., *J. Mater. Chem.* 2012, 22, 1180). $^1$H NMR (400 MHz, CDCl$_3$) ∂8.08 (s, 2H), 3.97 (s, 6H), 1.47 (s, 24H).

Dinonyl 2,5-bis(4,4,5,5-tetramethyl-1,3,2-dioxaborolan-2-yl)terephthalate (10). Dinonyl 2,5-dibromoterephthalate (8) (5.76 g, 10.00 mmol, 1.0 equiv.), bis(pinacolato)diboron (6.35 g, 25 mmol, 2.5 equiv.), oven-dried potassium acetate (2.45 g, 25 mmol, 2.5 equiv.), and [1,1'-bis(diphenylphosphino)ferrocene]dichloropalladium (II) (512 mg, 0.70 mmol, 7 mol %) were charged in an oven-dried 3-neck round bottomed flask, equipped with a reflux condenser and cooled under $N_2$. The extraneous openings were capped with standard rubber septa. Anhydrous 1,4-dioxane (100 mL) was added, and the suspension was degassed with bubbling nitrogen for ten minutes, before being heated to reflux. The reaction was heated at reflux for 24 hours, at which point, more bis(pinacolato)diboron (1.27 g, 5 mmol, 0.5 equiv.), potassium acetate (490 mg, 5 mmol, 0.5 equiv.), and [1,1'-bis(diphenylphosphino)ferrocene]dichloropalladium (II) (255 mg, 0.35 mmol, 3.5 mol %) were added. The reaction was monitored by TLC, using an expired gas chromatograph column inserted through a septum against positive nitrogen pressure, with the aid of an eighteen gauge syringe needle. Once complete conversion to the desired bis-borylated product was indicated (approximately 48 hours total), the reaction was allowed to cool to room temperature, and was transferred to a single-necked round bottom flash with the aid of chloroform. The mixture was cautiously concentrated in vacuo, then was redissolved in pure chloroform (50 mL), which was washed with pure water (25 mL), dried over $MgSO_4$ and suspended over ~1 g activated carbon for two hours, then was filtered and concentrated in vacuo to approximately 20 mL total volume. Methanol was added (50 mL) and the flask was placed in a −30° C. freezer to induce precipitation. After collecting the product by filtration, it was recrystallized again from pure methanol. Finally, the recrystallized product was redissolved in chloroform, to which activated carbon (~1 g) was added. The chloroform fraction was left to sit for three hours, at which point it was dried with $MgSO_4$, filtered and concentrated to yield the desired product as a white powder (4.47 g, 6.67 mmol, 67% yield).

$^1$H NMR (400 MHz, CDCl$_3$) ∂8.01 (s, 2H), 4.32 (t, J=6.8 Hz, 4H), 1.76 (m, 4H), 1.43 (s, 24H), 1.37-1.22 (m, 12H), 0.93-0.84 (m, 6H). $^{13}$C NMR (101 MHz, CDCl$_3$) ∂167.6, 136.4, 132.0, 84.2, 76.7, 65.8, 31.8, 29.5, 29.2, 29.2, 28.6, 25.9, 24.8, 22.6, 14.1. $^{11}$B NMR (193 MHz, CDCl$_3$) ∂31.3, relative to $BF_3.OEt_2$ external standard. IR (solid, ATR) 2955, 2917, 2851, 1702, 1491, 1372, 1279, 1243, 1141, 1117, 1081, 946, 850, 642 cm$^{-1}$. Elemental analysis calculated for $C_{38}H_{64}B_2O_8$: 68.07% C; 9.62% H. Found 67.97% C; 9.93% H.

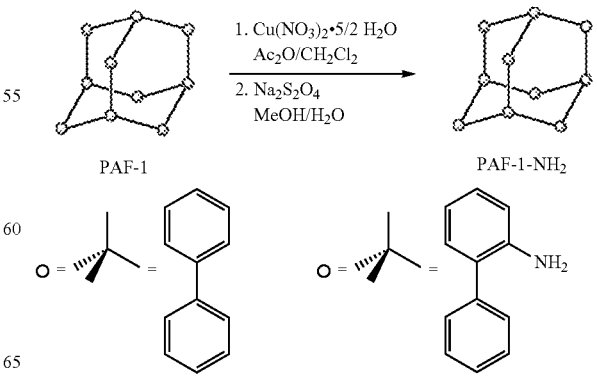

PAF-1-NH$_2$: PAF-1 (100 mg), synthesized according to the procedure of Qiu and Zhu,[4] was charged under N$_2$ in an oven-dried 40 mL scintillation vial equipped with a Teflon-lined septum, and a cap that allowed access to the septum. Acetic anhydride (7 mL) and anhydrous CH$_2$Cl$_2$ (7 mL) were added by syringe, and the vial was cooled to 0° C. Copper(II) nitrate hemi(pentahydrate) (1.61 g, 6.92 mmol) was added portionwise over five minutes. The ice bath was removed, and the reaction was allowed to warm to room temperature with stirring, and was left at that temperature for 24 hours. Solid PAF-1-NO$_2$ (presumed) was isolated by filtration, washed with hydrochloric acid (3 N, 2×20 mL), hot water (3×20 mL), and hot methanol (5×20 mL). The solid was left to air dry on the Büchner funnel over vacuum for fifteen minutes, and was then immediately carried on to the next step. The solid was suspended in 1:1 MeOH:H$_2$O (12 mL each, 24 mL total) under N$_2$ in an oven-dried 40 mL scintillation vial equipped with a Teflon-lined septum, and a cap that allowed access to the septum. Sodium dithionite was added (1.4 g, 8.0 mmol), and the reaction was heated to 70° C. for 24 hours. Solid PAF-1-NH$_2$ was isolated by filtration, and the solid was suspended in 80° C. water (30 mL) for one hour, at which point the water was removed by syringe, and refreshed pure hot water again (30 mL). This cycle was repeated five times. After the final removal of water by syringe, hot ethanol (60° C., 30 mL) was used for two cycles. After filtration from ethanol, washing with hot THF (5×20 mL) delivered the desired material as a white powder, which was activated under vacuum at 80° C. for 16 hours to provide the porous polymer (106 mg, 96% yield, based on 1 nitrogen incorporated per linker). Elemental analysis calculated for PAF-1-NH$_2$, assuming 1 new aniline per biphenyl linker: 86.68% C; 5.24% H, 8.09% N. Found 77.31% C; 4.43% H; 9.06% N. Both the elemental analysis for PAF-1-NH$_2$ and PAF-1-NH$_3$Cl suggests slightly more than 1 nitrogen/linker incorporation. The low carbon and hydrogen analysis at this stage may be due to small amounts of residual inorganic, or other adsorbed species. These species do not interfere with the further derivitization this material, as shown by the excellent elemental analysis for PAF-1-NH$_3$Cl.

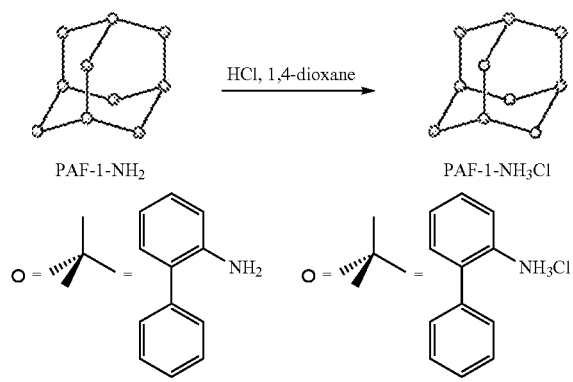

PAF-1-NH$_3$Cl: PAF-1-NH$_2$ (100 mg) was charged in an oven-dried 20 mL scintillation vial, along with anhydrous 1,4-dioxane (4 mL). Hydrochloric acid (4 N in 1,4-dioxane, 1 mL) was added, and the suspension was left to stir for 20 hours. The solid was obtained by filtration, and was washed with additional anhydrous 1,4-dioxane (8×10 mL), and anhydrous ethanol (2×10 mL). It was dried under vacuum at room temperature to deliver the desired porous polymer as a slightly beige powder (97 mg, 80% yield). The lower yield for this simple transformation may indicate the removal of some inorganic, or other adsorbed species associated with the aniline nitrogen, as was indicated by elemental analysis of PAF-1-NH$_2$. The elemental analysis for PAF-1-NH$_3$Cl was also consistent with slightly more than one nitrogen per linker being introduced. Calculated for 1 nitrogen/linker: 71.60% C; 4.81% H; 6.68% N. Found 71.53% C; 4.64% H; 8.34% N.

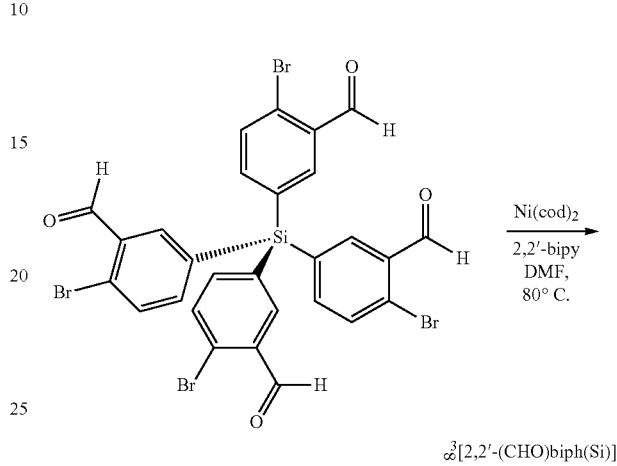

$\infty^3$[2,2'-(CHO)biph(Si)]

$\infty^3$[2,2'-(CHO)biph(Si)]: The procedure of Qiu and Zhu was directly applicable to this functionalized monomer (Ben, et al., Angew. Chem. Int. Ed. 2009, 48, 9457). Bis(cyclooctadiene)nickel(0) (958 mg, 3.48 mmol, 5.2 equiv.) was charged in an oven dried Schlenk flask inside an intert atmosphere glovebox. The flask was sealed and removed, and connected to a standard manifold for further manipulation. Vacuum dried 2,2'-bipyridine (544 mg, 3.48 mmol, 5.2 equiv.) was added against positive nitrogen pressure, followed by additional cyclooctadiene (545 μL, 4.44 mmol, 6.6 equiv.) and anhydrous DMF (50 mL). The solution was heated to 80° C. for one hour. [At this point, the solution should be a vibrant, dark violet color, without any hint of black or brown. Occasionally, especially when older sources of DMF were used, a significant dulling of the purple color of the reagent was noted, and these reactions universally gave unsatisfactory results. This issue was never encountered when using freshly obtained anhydrous DMF of high commercial grade (Sigma-Aldrich catalog number 227056), or DMF that had been stored under rigorously anhydrous conditions, protected from light and heat.] To the vibrant purple solution was added solid tetrakis(4-bromo-3-formylphenyl)silane 5 (475 mg, 0.62 mmol, 1.0 equiv.) against positive nitrogen pressure. The reaction was left to stir at 80° C. for 72 hours. At that point, it was allowed to cool to room temperature, and concentrated hydrochloric acid was added (25 mL), and the suspension was left to stir overnight. The solid was collected by filtration, washed with water (5×25 mL), absolute ethanol (5×25 mL) and tetrahydrofuran (5×25 mL). It was further purified by Soxhlet extraction with tetrahydrofuran (24 hours), and dried under vacuum at 150° C. to yield the desired polymer as a slightly beige powder (208 mg, 76% yield). Elemental analysis calculated for an ideal polymer (i.e. complete polymerization with no end-groups, no catalyst or reagent fragments incorporated): 75.66% C; 3.63% H. Found: 66.89% C; 4.63% H; 0.59% N. The presence of nitrogen suggests small amount of bipyridine or DMF-derived fragments are incorporated or trapped in the material. EDX and infrared analysis are shown below. Most importantly, no residual bromine was detected in these analyses.

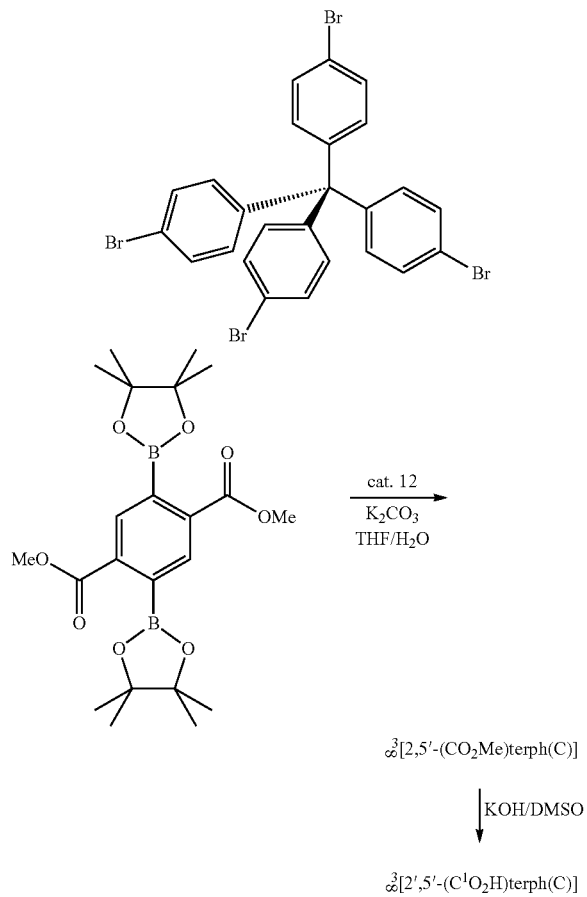

$_\infty^3$[2,5'-(CO$_2$Me)terph(C)]

↓ KOH/DMSO $_\infty^3$[2',5'-(C$^1$O$_2$H)terph(C)]

$_\infty^3$[2',5'-(CO$_2$Me)terph(C)] and $_\infty^3$[2',5'-(C$^1$O$_2$H)terph (C)]: An oven-dried round bottomed flask, cooled under N$_2$, was charged with dimethyl 2,5-bis(4,4,5,5-tetramethyl-1,3,2-dioxaborolan-2-yl)terephthalate (9) (229 mg, 0.513 mmol, 2.05 equiv.), tetrakis(4-bromophenyl)methane (159 mg, 0.250 mmol, 1.0 equiv.) and chloro(2-dicyclohexylphosphino-2',6'-dimethoxy-1,1'-biphenyl)[2-(2'-amino-1,1'-biphenyl)]palladium(II) (12) (5.0 mg, 0.007 mmol, 0.7 mol % relative to Br functional groups), and was purged for ten minutes with flowing nitrogen. Degassed THF (6 mL) and degassed aqueous potassium carbonate (2 M, 0.6 mL) were added, and the solution was heated to 60° C. for 48 hours. During the course of polymerization, the reaction became an extremely viscous gel. The gel was cooled to room temperature, and was transferred onto a Büchner funnel with the aid of additional THF. With constant vacuum applied, the gel eventually collapsed into a free-flowing powder, which was washed with hot hydrochloric acid (3 N, 5×15 mL), hot water (5×15 mL), hot ethanol (5×15 mL), and hot CHCl$_3$ (5×15 mL). The obtained powder was then further purified by Soxhlet extraction with THF (24 h). The polymer was activated at 100° C. under vacuum to deliver the desired porous material to $_\infty^3$[2',5'-(CO$_2$Me)terph(C)] (146.9 mg, 84% yield). Elemental analysis calculated for ideal 1:1 polymer: 77.13% C; 4.60% H. Calculated for stoichiometric incorporation of monomers (i.e. 5% excess of terephthalic monomer, due to boronate homocoupling or selective end-capping): 76.92% C; 4.61% H. Found: 72.36% C; 4.28% H. $_\infty^3$[2',5'-(CO$_2$Me)terph(C)] (82 mg) was charged, under N$_2$, in an oven-dried 40 mL scintillation vial which was equipped with a Teflon lined septum and vial cap which allowed access to the septum. Solid potassium hydroxide was added (450 mg), followed by anhydrous DMSO (20 mL). The vial was heated to 150° C. for 24 hours. After cooling to room temperature, the solid was collected by filtration, washed with methanol (3×20 mL), and allowed to air dry on the Büchner funnel over vacuum for 15 minutes. The obtained solid was re-subjected to identical basic conditions for another 24 hours, with fresh KOH/DMSO. After filtering and washing with methanol again, the obtained solid was suspended in hydrochloric acid (1 N, 20 mL) at room temperature for eight hours. The acid was removed with a syringe, with care not to remove any polymer. Next, the solid was exposed to hydrochloric acid of higher concentration (3 N, 20 mL) at room temperature overnight (~12 hours). Again, the acid was removed by syringe, and water was added (20 mL). The vial was left to sit at 80° C. for one hour, at which point the water was removed by syringe, and refreshed with fresh water (20 mL). This exchange was repeated twice more, before the polymer was finally collected by filtration. Soxhlet extraction with THF (16 h) delivered the final product $_\infty^3$[2',5'-(C$^1$O$_2$H)terph(C)] as a very slightly yellow solid (61 mg, 81% yield). IR analysis indicated complete sidechain cleavage. TGA analysis of $_\infty^3$[2',5'-(C$^1$O$_2$H)terph(C)] indicated stability close to 300° C., with no difference observed between the free acids $_\infty^3$[2',5'-(C$^1$O$_2$H)terph(C)] and $_\infty^3$[2',5'-(C$^9$O$_2$H)terph(C)].

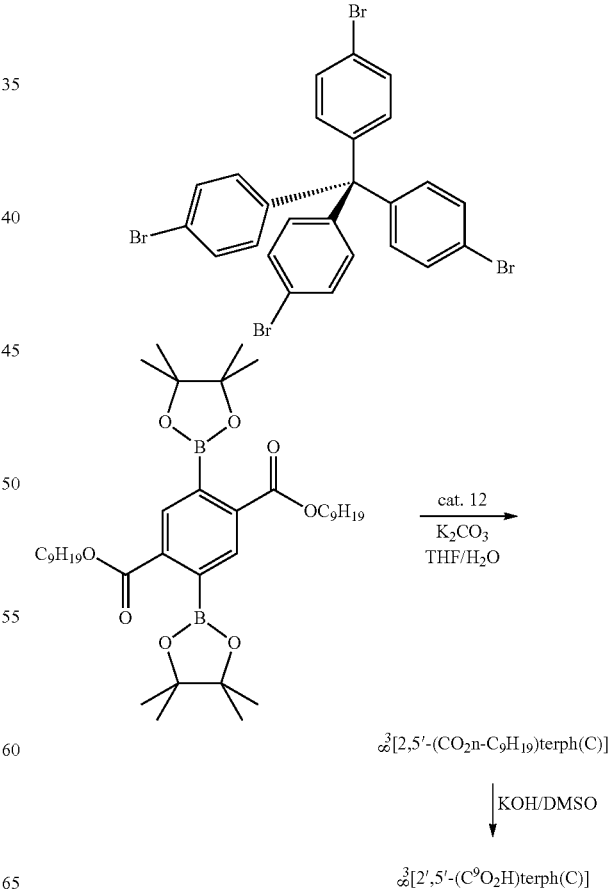

$_\infty^3$[2,5'-(CO$_2$n-C$_9$H$_{19}$)terph(C)]

↓ KOH/DMSO $_\infty^3$[2',5'-(C$^9$O$_2$H)terph(C)]

$_\infty^3$[2',5'-(CO$_2$n-C$_9$H$_{19}$)terph(C)] and $_\infty^3$[2',5'-(C$^9$O$_2$H)terph(C)]: An oven-dried round bottomed flask, cooled under N$_2$, was charged with dinonyl 2,5-bis(4,4,5,5-tetramethyl-1,3,2-dioxaborolan-2-yl)terephthalate (9) (1.50 g, 2.24 mmol, 2.05 equiv.), tetrakis(4-bromophenyl)methane (694 mg, 1.09 mmol, 1.0 equiv.) and chloro(2-dicyclohexylphosphino-2',6'-dimethoxy-1,1'-biphenyl)[2-(2'-amino-1,1'-biphenyl)]palladium(II) (12) (35 mg, 0.049 mmol, 1.1 mol % relative to Br functional groups), and was purged for ten minutes with flowing nitrogen. Degassed THF (54 mL) and degassed aqueous potassium carbonate (2 M, 5.4 mL) were added, and the solution was heated to 60° C. for 72 hours. During the course of polymerization, the reaction became an extremely viscous gel. The gel was cooled to room temperature, and was transferred onto a Büchner funnel with the aid of additional THF. With constant vacuum applied, the gel eventually collapsed into a free-flowing powder, which was washed with hot hydrochloric acid (3 N, 5×30 mL), hot water (5×30 mL), hot ethanol (5×30 mL), and hot CHCl$_3$ (5×30 mL). The obtained powder was then further purified by Soxhlet extraction with THF (24 h). The polymer was activated at 100° C. under vacuum to deliver the desired, though non-porous material $_\infty^3$[2',5'-(CO$_2$n-C$_9$H$_{19}$)terph(C)] (1.08 g, 86% yield). Elemental analysis calculated for ideal 1:1 polymer: 80.45% C; 8.42% H. Calculated for stoichiometric incorporation of monomers (i.e. 5% excess of terephthalic monomer, due to boronate homocoupling or selective end-capping): 80.34% C; 8.46% H. Found: 77.36% C; 8.57% H.

$_\infty^3$[2',5'-(CO$_2$n-C$_9$H$_{19}$)terph(C)] (998 mg) was charged, under N$_2$, in an oven-dried round bottomed flask. Solid potassium hydroxide was added (1.35 g), followed by anhydrous DMSO (60 mL). The flask was heated to 150° C. for 24 hours. After cooling to room temperature, the solid was collected by filtration, washed with methanol (3×50 mL), and allowed to air dry on the Büchner funnel over vacuum for 15 minutes. The obtained solid was re-subjected to identical basic conditions for another 24 hours, with fresh KOH/DMSO. This cycle was repeated a total of three times. After filtering and washing with methanol the third time, the obtained solid was suspended in hydrochloric acid (1 N, 30 mL) at room temperature for eight hours. The acid was removed with a syringe, with care not to remove any polymer. Next, the solid was exposed to hydrochloric acid of higher concentration (3 N, 30 mL) at room temperature overnight (~12 hours). Again, the acid was removed by syringe, and water was added (30 mL). The vial was left to sit at 80° C. for one hour, at which point the water was removed by syringe, and refreshed with fresh water (30 mL). This exchange was repeated twice more, before the polymer was finally collected by filtration. Soxhlet extraction with THF (16 h) delivered the final product $_\infty^3$[2',5'-(C$^9$O$_2$H)terph(C)] as a very slightly yellow solid (480 mg, 86% yield). IR analysis indicated complete sidechain cleavage. Most importantly, EDX analysis of $_\infty^3$[2',5'-(C$^9$O$_2$H)terph(C)] indicated no residual bromine.

Generic Procedure for Bis(Cyclooctadiene)Nickel(0) Polymerization.

The procedure applied was that reported for the original synthesis of PAF-1 (Ben, et al., *Chem., Int. Ed.* 2009, 48:9457). Bis(cyclooctadiene)nickel(0) (5.2 equiv.) was charged in an oven-dried Schlenk flask inside an inert atmosphere glovebox. The flask was sealed and removed, and connected to a standard manifold for further manipulation. Vacuum dried 2,2'-bipyridine (5.2 equiv.) was added against positive nitrogen pressure, followed by 1,5-cyclooctadiene (6.6 equiv.) and anhydrous DMF (0.05 M concentration, relative to C—Br bonds). The solution was heated to 80° C. for 1 h. [At this point, the solution should be a vibrant, dark violet color, without any hint of black or brown. Occasionally, especially when older sources of DMF were used, a significant dulling of the purple color of the reagent was noted, and these reactions universally gave unsatisfactory results. This issue was never encountered when using freshly obtained anhydrous DMF of high commercial grade, or DMF that had been stored under rigorously anhydrous conditions, protected from light and heat.] Solid tetrakis (arylbromide) (1.0 equiv., 4.0 equiv. C—Br functional groups) was added to the vibrant purple solution against positive nitrogen pressure. The reaction was left to stir at 80° C. for 72 h. At that point, it was allowed to cool to room temperature, and concentrated hydrochloric acid was added (one-half the volume of DMF), and the suspension was left to stir overnight. The resulting solid was collected by filtration, washed with water (5 washes with HCl volume), absolute ethanol (5 washes with HCl volume) and THF (5 washes with HCl volume). It was further purified by Soxhlet extraction with THF (24 h), and dried under vacuum at the specified temperature to yield the desired polymer.

Generic Procedure for Palladium-Catalyzed Polymer Synthesis.

An oven-dried round bottomed flask, cooled under N$_2$, was charged with a bis(pinacolborane)aryl monomer (2.1 equiv.), tetrakis(4-bromophenyl)methane (1.0 equiv.) and chloro(2-dicyclohexylphosphino-2',6'-dimethoxy-1,1'-biphenyl)[2-(2'-amino-1,1'-biphenyl)]palladium(II) (0.70-1.1 mol % relative to Br functional groups), and was purged for 10 min with flowing nitrogen. Degassed THF (0.042 M relative to tetrabromide) and degassed aqueous potassium carbonate (2 M, 10% of THF volume) were added, and the solution was heated to 60° C. for 48-72 h. During the course of the polymerization, the reaction became an extremely viscous gel. The gel was cooled to room temperature, and was transferred onto a Büchner funnel with the aid of additional THF. With constant vacuum applied, the gel eventually collapsed into a free-flowing powder, which was washed with hot hydrochloric acid (3 N, 5 washes with triple THF volume), hot water (5 washes with triple THF volume), hot ethanol (5 washes with triple THF volume), and hot CHCl$_3$ (5 washes with triple THF volume). The resulting powder was then further purified by Soxhlet extraction with THF (24 h). The polymer was activated at the appropriate temperature under vacuum to deliver the desired material.

Generic Procedure for Side-Chain Cleavage to Yield Free Terephthalic Acid Polymers.

A solid terephthalic ester polymer was charged, under N$_2$, in an oven-dried round bottomed flask. Solid potassium hydroxide was added (135 wt %), followed by anhydrous DMSO (to 0.4 M KOH). The flask was heated to 150° C. for 24 h. After cooling to room temperature, the solid was collected by filtration, washed with methanol (3 washes with DMSO volume), and allowed to air dry on the Büchner funnel over vacuum for 15 min. The resulting solid was re-subjected to identical basic conditions for another 24 h using fresh KOH/DMSO. This cycle was repeated a total of two to three times, depending on the polymer. After filtering and washing with methanol the final time, the resulting solid was suspended in hydrochloric acid (1 N, 50% of DMSO volume) at room temperature for 8 h. The acid was removed with a syringe, with care not to remove any polymer. Next, the solid was exposed to hydrochloric acid of higher concentration (3 N, 50% of DMSO volume) at room temperature for 12 h. Again, the acid was removed by syringe, and water was added (50% of DMSO volume). The vial was left to sit at 80° C. for 1 h, at which point the water was removed by syringe, and replaced with fresh water (50% of DMSO volume). This exchange was repeated twice more, before the polymer was finally collected by filtration. Soxhlet extraction with THF (16 h) delivered the final product, which was activated at the appropriate temperature under vacuum to deliver the desired porous acidic polymer.

Results and Discussion

Brønsted-Acidic Metal-Organic Frameworks.

Figure 3A:
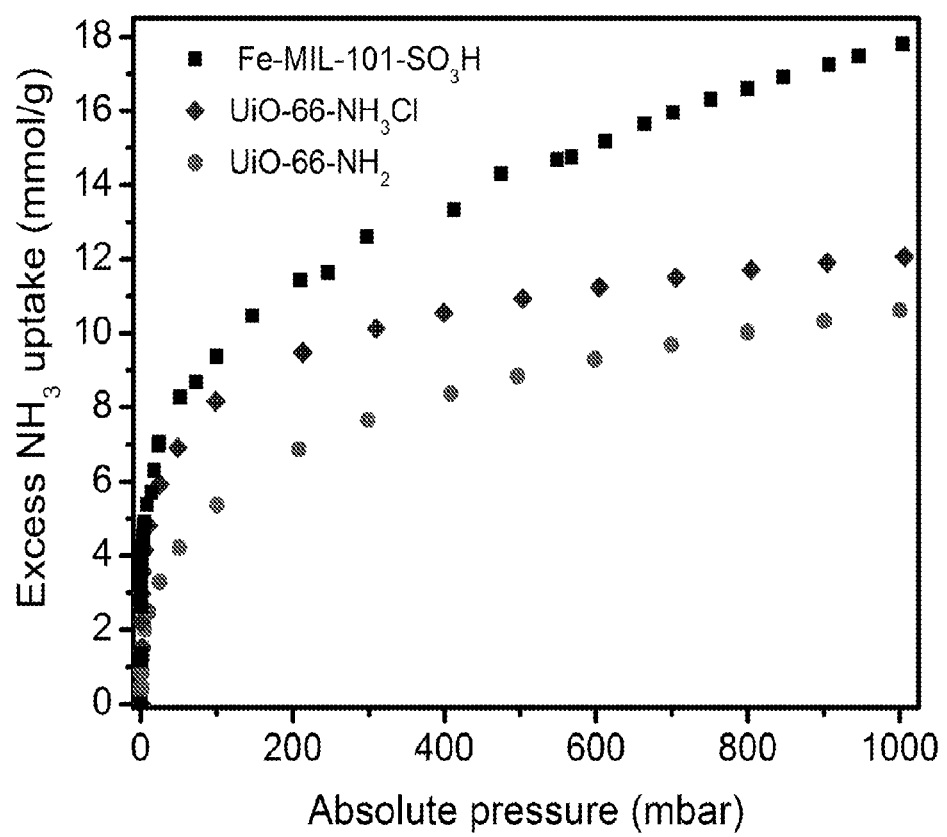
FIG. 3A and FIG. 3B. Ammonia adsorption at 298 K in Brønsted acidic MOFs (Fe-MIL-101-$SO_3H$: (■). UiO-$NH_3Cl$: (♦)) and a non-acidic structure (UiO-66-$NH_2$: (●)).
Figure 3B:
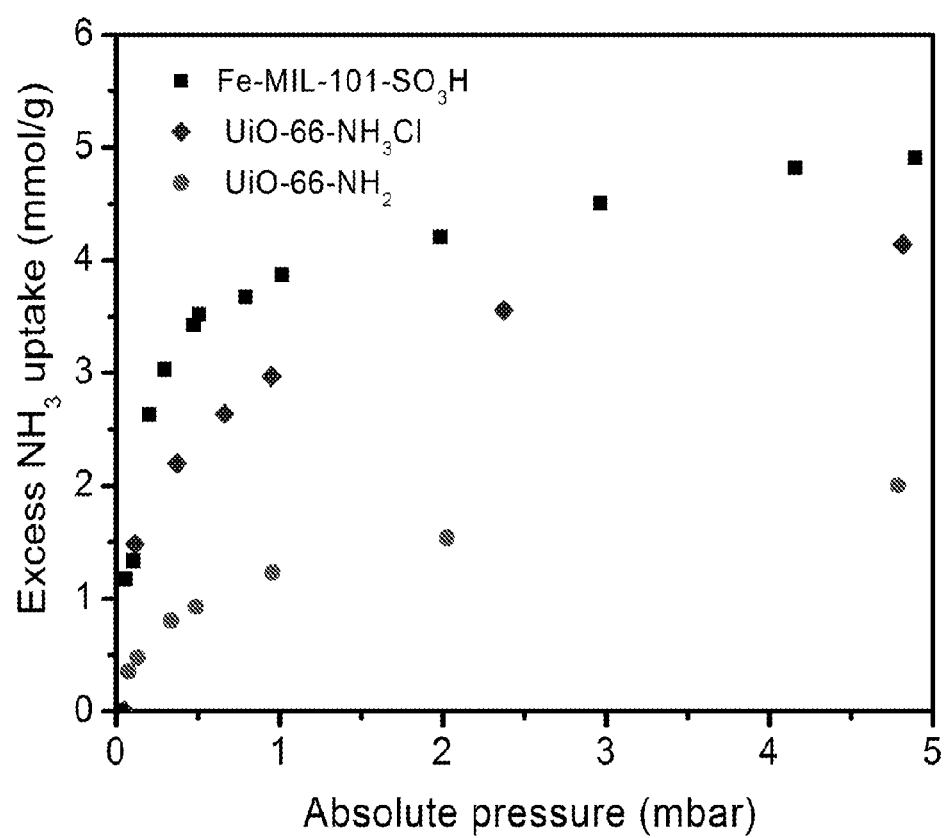

Inclusion of hydrochloric acid equivalents in the 2-aminoterephthalic acid derivative of UiO-66 ($[Zr_6O_4(OH)_4][p-(CO_2)_2C_6H_3NH_2]_6$) allows for a significant increase in ammonia uptake, even with only one-third of the organic linkers protonated (Morris, et al., *Inorg. Chem.* 2011, 50:6853). Exposure of the neutral parent framework UiO-66-$NH_2$ to anhydrous hydrochloric acid in 1,4-dioxane did not result in any loss of crystallinity, although analysis of powder X-ray diffraction data could not unequivocally locate the chloride counterion in the presumed anilinium chloride UiO-66-$NH_3Cl$. The ideal structure would deliver a moderate density (3.35 mmol/g) of anilinium sites, along with the weakly acidic hydroxide protons found in the inorganic cluster (2.23 mmol/g). For a representative example of a stronger Brønsted acid, Fe-MIL-101-$SO_3H$ (Akiyama, et al., *Adv. Mater.* 2011, 23:3294) provides a comparable number of total acidic sites to UiO-66-$NH_3Cl$, distributed between the protic sulfonic acids (2.19 mmol/g) and Lewis acidic unsaturated metal centers (3.28 mmol/g). The room temperature (298 K) ammonia uptakes for these materials are shown in FIGS. 3A-3B. The improvement in uptake—especially at low pressure—shown by UiO-66-$NH_3Cl$ as compared to the parent framework (i.e., 0.93 mmol/g at 488 ppm for UiO-66-$NH_2$ vs. 2.64 mmol/g at 663 ppm for UiO-66-$NH_3Cl$) confirms the prediction that Brønsted-acidic adsorption sites could lead to meaningful ammonia adsorption at low pressure. Gratifyingly, the more acidic framework Fe-MIL-101-$SO_3H$ yielded an exceptional adsorbent, which displayed improved uptake at low pressure (3.52 mmol/g at 510 ppm) and, owing to its significantly higher specific surface area, at higher pressure as well (17.80 mmol/g at 1004 mbar).

Porous Aromatic Polymers with Isolated Brønsted-Acidic Substituents.

Although encouraging performance was seen for low-pressure ammonia adsorption in UiO-66-$NH_3Cl$ and Fe-MIL-101-$SO_3H$, these materials face certain practical limitations. Although UiO-66-$NH_3Cl$ maintained crystallinity after controlled HCl addition, ammonia adsorption in this specific case results in the formation of $NH_4Cl$, which prevents the reactivation and recycling of this material by a simple temperature and/or vacuum swing. Fe-MIL-101-$SO_3H$ seemed like a more promising material for further optimization, with one significant caveat: with the appended sulfonic acids already delivering very high Brønsted acidity, it is not clear how the performance of this material could be improved further.

Figure 4B:
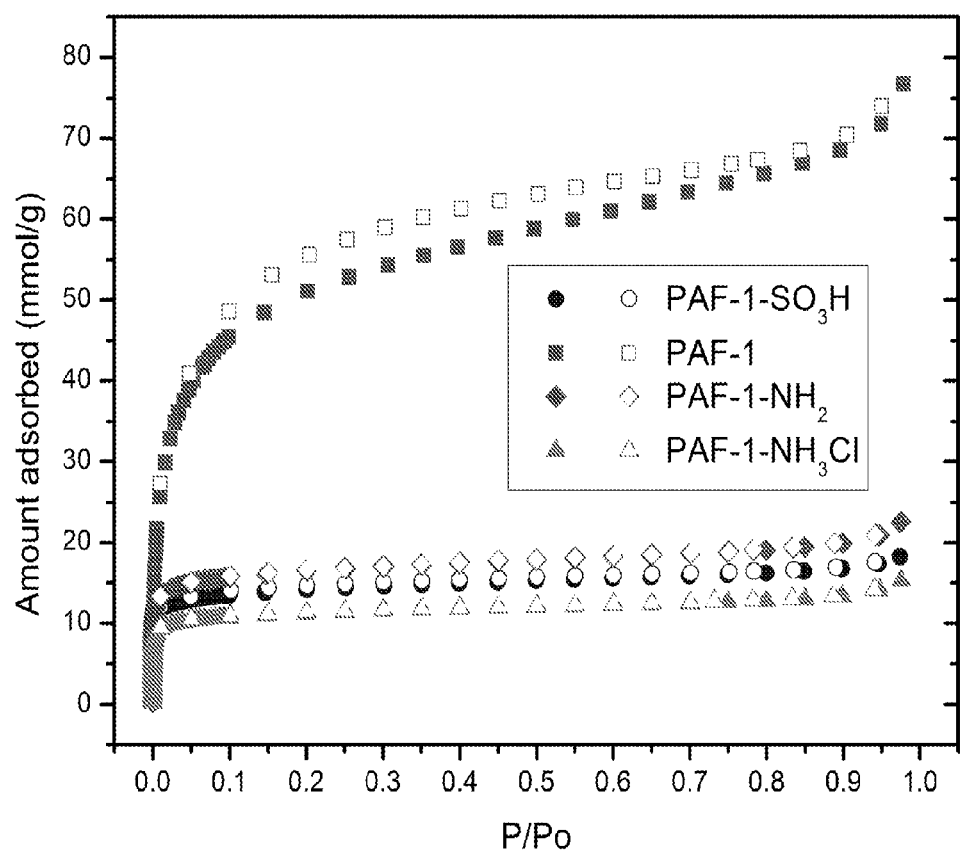

With high specific surface area and exceptional chemical stability, PAF-1 seemed like an ideal platform for the development of acidic adsorbents. Already, Zhou has described the conversion of PAF-1 into the analogous sulfonic acid-functionalized material (PAF-1-$SO_3H$) (Lu, et al., *J. Am. Chem. Soc.* 2011, 133:18126), and while it was recognized that PAF-1-$NH_3Cl$ would represent a sub-optimal material due to $NH_4Cl$ formation, it would allow for the effect of the framework backbone, as opposed to functional group complement, to be directly interrogated. The present approach to the synthesis of the required materials is shown in FIGS. 4A-4B. The parent material was synthesized according to the original procedure (Ben, et al., *Chem., Int. Ed.* 2009, 48:9457). Menke conditions—a far milder alternative to $HNO_3$—introduces nitrogen as an aromatic nitro group, which was fully reduced to the corresponding aniline by sodium dithionite to deliver PAF-1-$NH_2$, as indicated by FTIR analysis. Simple protonation with anhydrous hydrochloric acid provided the anilinium chloride-functionalized material PAF-1-$NH_3Cl$. Following the reported procedure (Lu, et al., *J. Am. Chem. Soc.* 2011, 133:18126), exposure to chlorosulfonic acid affords the arylsulfonic acid polymer PAF-1-$SO_3H$. The nitrogen adsorption characteristics of these materials are also presented in FIGS. 4A-4B. Functional group addition to PAF-1 results in a significant reduction in the BET surface area, from 4240 $m^2/g$ in the parent framework, to 1400 $m^2/g$ in PAF-1-$NH_2$, 965 $m^2/g$ in PAF-1-$NH_3Cl$, and 1200 $m^2/g$ in PAF-1-$SO_3H$.

Figure 5B:
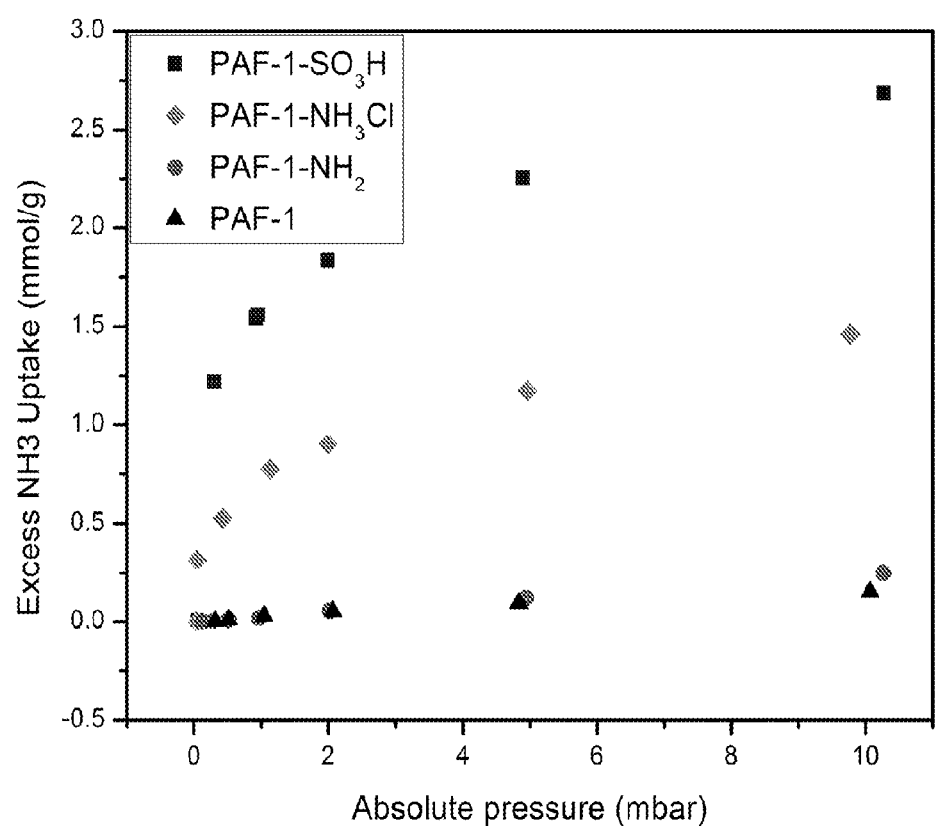

As expected, surface area as determined by $N_2$ adsorption is not predictive of ammonia uptake (FIGS. 5A-5B). Instead, there is a clear relationship between functional group acidity and adsorption, at both our low-pressure value of interest (500 ppm) and at the highest pressure investigated (1 bar). With relative acidity seemingly dominating adsorption performance, it is unsurprising that the metal-organic frameworks investigated show better uptake for the same functional group substitutions (i.e., 2.64 mmol/g at 663 ppm for UiO-66-$NH_3Cl$ vs. 0.97 mmol/g at 636 ppm for PAF-1-$NH_3Cl$; 3.52 mmol/g at 510 ppm for Fe-MIL-101-$SO_3H$ vs. 1.54 mmol/g at 919 ppm for PAF-1-$SO_3H$). The electron withdrawing ability of the two carboxylate groups in the terephthalate linkers of the UiO-66 and MIL-101 series should increase the acidity of the ammonium chloride and sulfonic acid, respectively.

Porous Aromatic Polymers with Cooperative Brønsted-Acidic Substituents.

Given the ammonia uptake results obtained for metal-organic frameworks and porous aromatic frameworks with isolated Brønsted acidic functional groups, it seemed likely that we would not be able to increase uptake substantially—especially at low pressure—through further tuning of the functional group, as sulfonic acids represented some of the most acidic groups that are readily accessible synthetically. Traditional adsorbents such as zeolites and activated carbons, which have been investigated in the context of ammonia adsorption, are similarly limited in their chemical tunability (Petit, et al., *J. Adv. Funct. Mater.* 2010, 20:111; Helminen, et al., *J. Chem. Eng. Data* 2001, 46:391; Petit, et al., *J. Phys. Chem. C* 2009, 113:3800; Petit, et al., *Carbon* 2010, 48:654; and Petit, et al., *J. Microporous Mesoporous Mater.* 2008, 114:137). Instead, we were inspired by recent computational results suggesting that the cooperative activity of multiple groups could have a strong positive effect on low-pressure adsorption. Although the PAFs displayed lower uptakes in the materials investigated here, we preferred to base further development around this platform for a simple reason: binding sites that contained multiple acidic functional groups (e.g., $CO_2H$) close enough in space to interact with a single ammonia molecule would likely also bind metal atoms strongly, potentially disrupting metal-organic framework synthesis.

Scheme 1. Synthesis of meta-substituted porous aromatic polymer precursors.

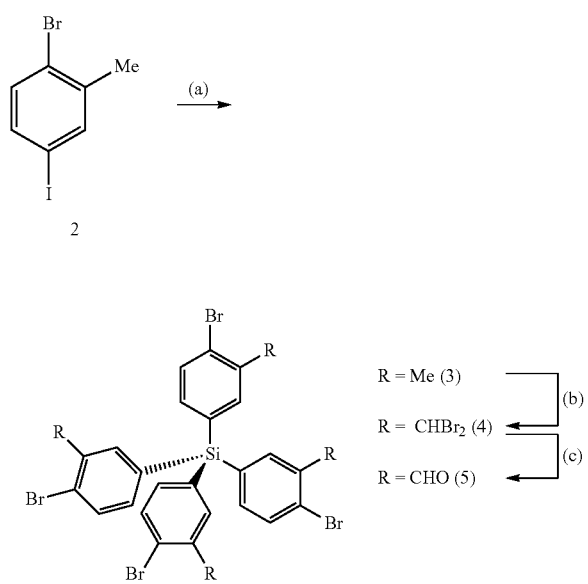

Conditions: (a) n-BuLi, THF, -78° C., then SiCl$_4$, -78° C., 72%, (b) enzoyl peroxide, N-bromosuccinimide, CCl$_4$, reflux 62%, and (c) Dimethyl sulfoxide/acetic acid/water (90/5/5v/v), 105° C., 66%.

The monomeric precursor utilized to prepare a close analog to PAF-1 (and also to EOF-1), with functional groups poised to interact cooperatively, was successfully synthesized employing the method presented in Scheme 1. Selective metallation of bromoiodoarene 2 and four-fold addition to silicon tetrachloride produced tetra-meta-methylated arylsilane 3. Selective eight-fold bromination under radical conditions yields 4. All attempts to monobrominate each benzylic position selectively resulted in a mixture of doubly-, singly-, and non-brominated methyl groups. Hydrolysis in wet and slightly acidic DMSO provides tetrakis(3-formyl-4-bromophenyl)silane 5, which has both the halide atoms requisite for polymerization, and a versatile functional group handle for post-synthetic modification.

Figure 6B:
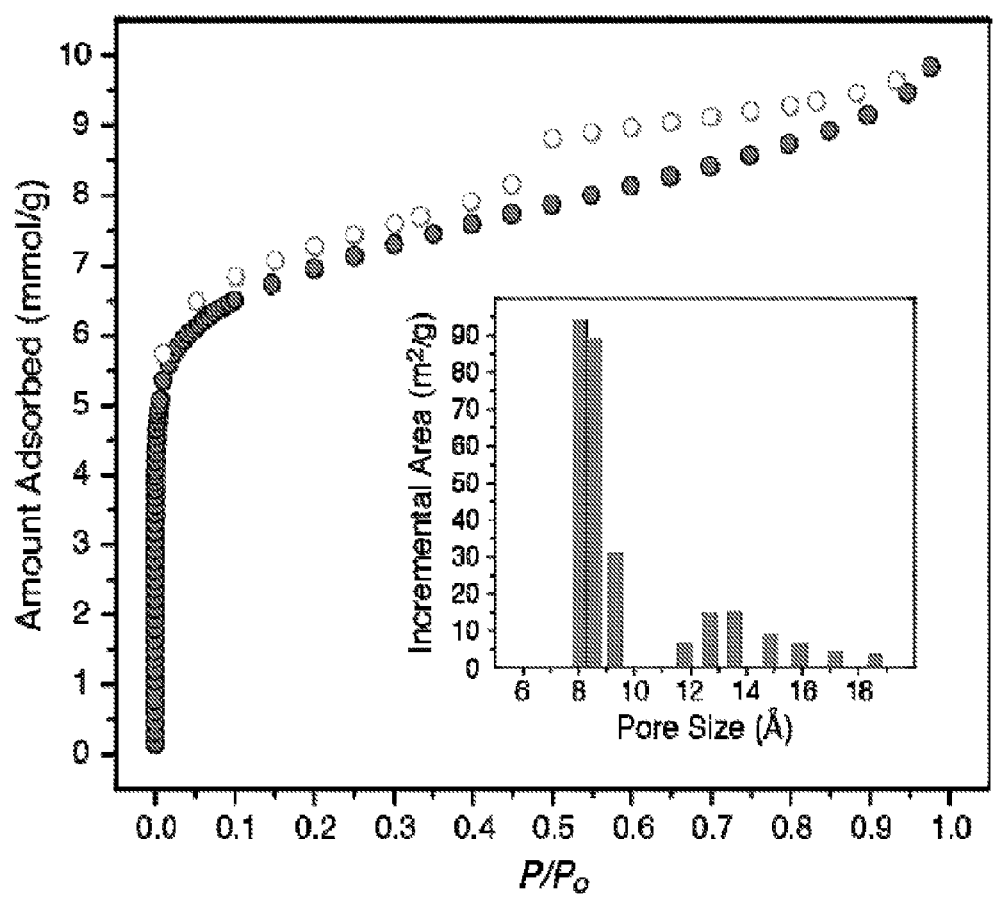

Polymerization of 5 proceeded as expected under identical conditions as used previously, to yield a PAF-1 (and EOF-1) analog that bears functional groups in the positions directly adjacent to the biphenyl bond, poised to interact cooperatively during gas adsorption ($_\infty^3$[2,2'-(CHO)biph(Si)], FIGS. 6A-6B). However, surprisingly a surface area approximately one-half of what would be expected was found, based on the functionalized PAF-1 derivatives presented above (570 m$^2$/g BET vs 965-1400 m$^2$/g). Analysis of residual bromine by energy dispersive X-ray spectroscopy (EDX) indicated no remaining bromine, to the limit of detection, suggesting that the low surface area observed was not due to a low degree of polymerization. Instead, pore size distribution revealed that the source of the low observed nitrogen uptake was framework interpenetration (Ermer, O., J. Am. Chem. Soc. 1988, 110:3747), with the dominant diameters being much smaller than the ~11 Å expected for an open-pore structure. As the steric parameters of functionalized monomer 5 are not remarkably different from the monomer used to synthesize PAF-1 (i.e., tetrakis(4-bromophenyl)methane), it seems likely that an increased attractive interaction between independent networks, due to the dipole-dipole interaction between the aldehyde substituents, drives interpenetration.

Although network interpenetration results in lower specific surface area, it also offers a new design element that can be leveraged for materials synthesis. If functional group substitution leads to an associative interaction, this self-assembly between individual polymer networks allows for the creation of strong binding sites that occur between independent networks. This approach has a number of significant advantages. In addition to removing the rigorous requirement for substitution at both ortho positions across the same biphenyl bond, the spatial relationship of cooperative functional groups could be fine tuned by adjusting network packing. As a practical advantage, this strategy also allows high-performance materials to be generated without recourse to using expensive and air-sensitive Ni(cod)$_2$, as in typical Yamamoto polymerization conditions (vide infra) (Rose, et al., Soft Matter 2010, 6:3918).

Scheme 2. Synthesis of terephthalic ester monomers, polymerization, and deprotection to yield acidic porous networks.

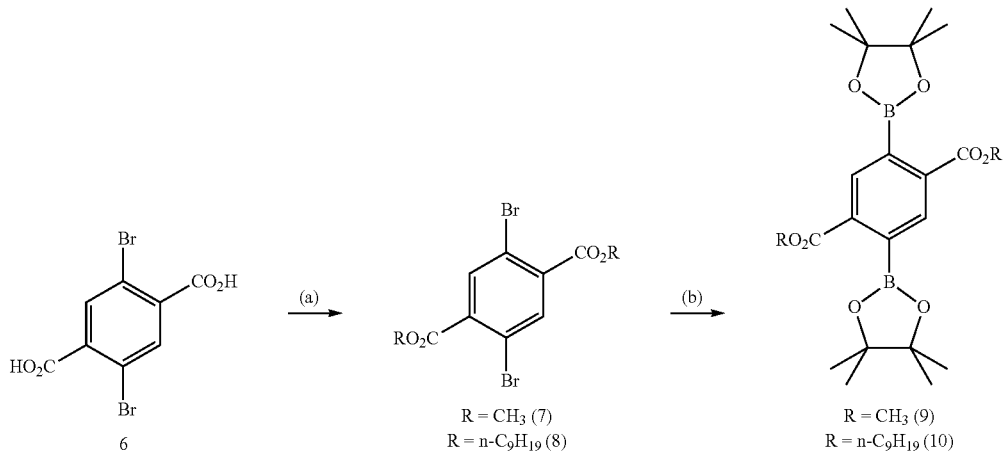

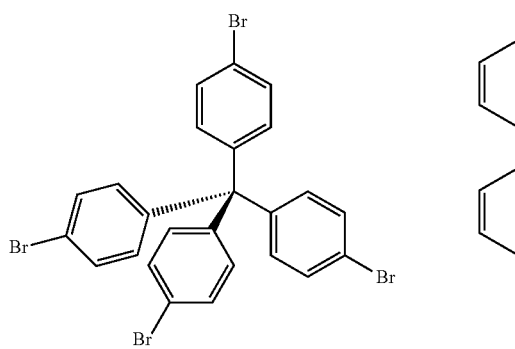
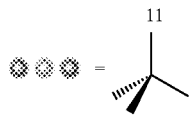
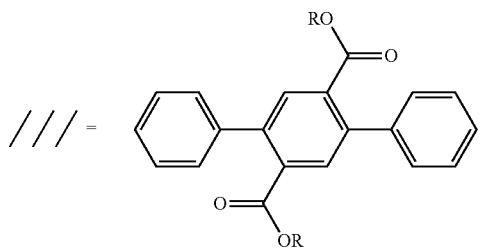
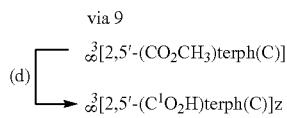
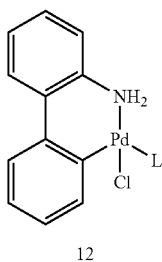
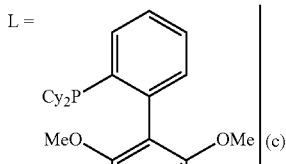
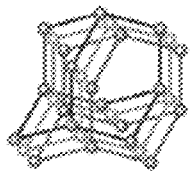

via 9
(d) $\infty^3[2',5'-(CO_2CH_3)terph(C)]$
→ $\infty^3[2',5'-(C^1O_2H)terph(C)]z$ via 10
(d) $\infty^3[2',5'-(CO_2n-C_9H_{19})terph(C)]$
→ $\infty^3[2',5'-(C^9O_2H)terph(C)]$ Conditions: (a) (COCl)$_2$, PhH; ROH, pyridine, CH$_2$Cl$_2$, 79-89%; (b) Pd(dppf)Cl$_2$, B$_2$pin$_2$, KOAc, 1,4-dioxane, 61-67%; (c) 9 or 10, 11, cat. 12, K$_2$CO$_3$, THF/H$_2$O, 84-86%; (d) KOH DMSO, 81-86%.

Figure 7:
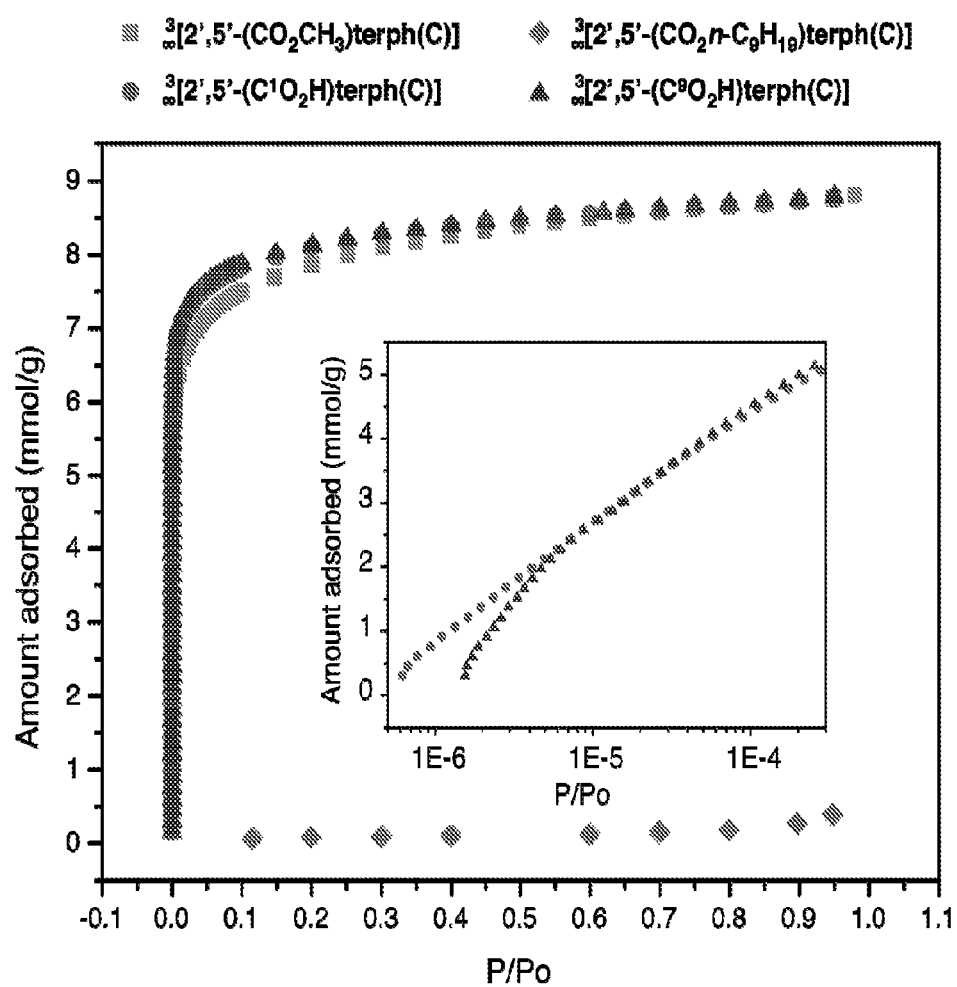
FIG. 7. Nitrogen adsorption characteristics of acidic porous aromatic polymers derived from methyl and 1-nonyl terephthalate esters. Terephthalic acid dervied from methyl ester: $C^1O_2H$, (●). Terephthalic acid derived from 1-nonyl ester: $C^9O_2H$, (▲). Methyl terephthalate ester: $CO_2-CH_3$, (■). 1-Nonyl terephthalate ester: $CO_2n-C_9H_{19}$, (♦). Open circles represent desorption data.
Figure 8:
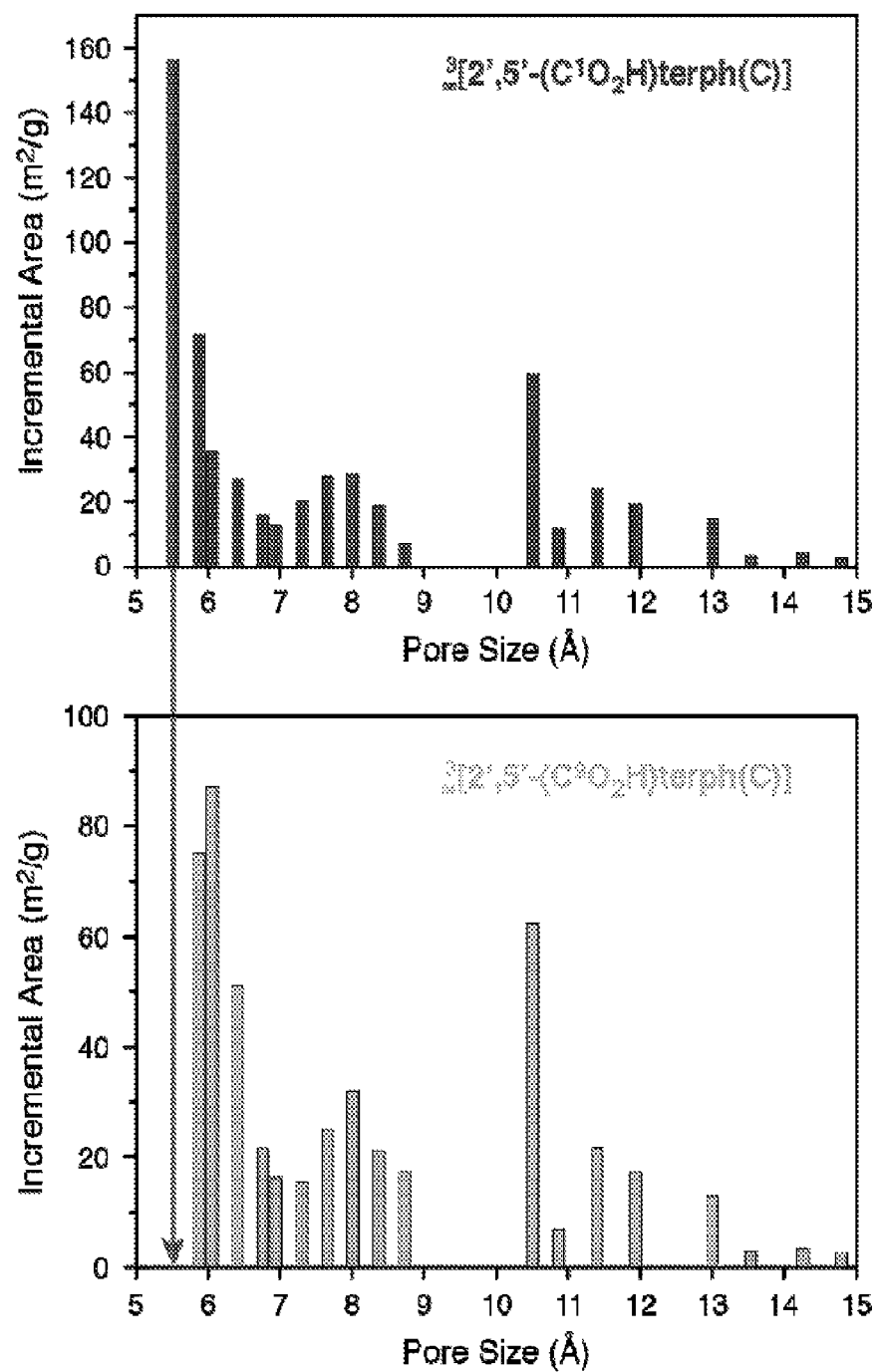
FIG. 8. Effect of terephthalate ester size on pore size distribution after saponification. Methyl ester derived polymer $_\infty^3[2,5'-(C^1O_2H)terph(C)]$=(top graph). 1-Nonyl ester derived polymer $_\infty^3[2,5'-(C^9O_2H)terph(C)]$=(bottom graph).

The syntheses of PAF materials fulfilling these properties are presented in Scheme 2. Monomer synthesis begins with 2,5-dibromoterephthalic acid (6), which is commercially available, or easily generated from inexpensive 1,4-dibromo-2,5-dimethylbenzene (Yao, et al., *Macromolecules* 1999, 32:2455). Esterification with methanol (7) or 1-nonanol (8) and Miyaura borylation (Ishiyama, et al., *J. Org. Chem.* 1995, 60:7508) delivers functional cross-coupling partners 9 and 10. Suzuki polymerization with the same monomer used in PAF-1 synthesis (11) is enabled by Buchwald's recently disclosed palladacycle precatalyst (Kinzel, et al., *J. Am. Chem. Soc.* 2010, 132:14073) delivering insoluble materials at acceptably low catalyst loadings (0.7-1.1 mol % relative to new carbon-carbon bonds). Less reactive catalysts that have been successful in the synthesis of other PAFs (e.g., Pd(PPh$_3$)$_4$) (Jing, et al., *Microporous Mesoporous Mater.* 2013, 165:92; and Zhang, et al., *Chem., Int. Ed.* 2012) were ineffective in this challenging case. Nitrogen adsorption data obtained for the acidic polymers, and their ester precursors, are shown in FIG. 7. The polymer derived from methyl terephthalic ester 9, $\infty^3[2',5'-(CO_2CH_3)$ terph(C)], presented a BET surface area of 665 m$^2$/g, suggesting at least three-fold interpenetration. Saponification under extremely vigorous conditions (KOH, anhydrous DMSO, 150° C.), and subsequent re-acidification with 3 N HCl, delivered the desired Brønsted acidic adsorbent $\infty^3[2',5'-(C^1O_2H)terph(C)]$ with a slightly increased BET surface area of 700 m$^2$/g. Similar polymerization with 1-nonyl terephthalate ester 10 produced the non-porous polymer $\infty^3[2',5'-(CO_2n-C^9H_{19})terph(C)]$. However, after sidechain cleavage, the resulting acidic material, $\infty^3[2',5'-(C^9O_2H)terph(C)]$, displayed porosity effectively identical to the acidic polymer derived from 9 (705 m$^2$/g C9 vs 700 m2/g C1). Again, residual bromine was below the limit of detection by EDX spectroscopy, suggesting an efficient polymerization to form terphenyl bridges. Despite these very similar surface areas, there was a noticeable difference in the extremely low-pressure N$_2$ adsorption (FIG. 7, inset). This is likely the result of the larger 1-nonanol side-chains preventing extremely dense network packing, a theory supported by the pore size distribution (FIGS. 7A-7B). The dominant pore size observed in methyl ester-derived acidic polymer $\infty^3[2',5'-(C^1O_2H)terph(C)]$ is near the lower limit of N$_2$ detection, at approximately 5.4-5.6 Å. This pore size is entirely absent in the 1-nonyl ester-derived material $\infty^3[2', 5'-(C^9O_2H)terph(C)]$. A corresponding increase is seen in pore sizes ranging from ~6.0-6.5 Å.

Not only do these polymers display a high density of functional groups (6.0 mmol/g), they also function to simultaneously interrogate the following hypotheses: If the ammonia uptake demonstrated by the materials is only dependent upon the effective pH, then the uptake at low pressure would be expected to be inferior to the much more acidic PAF-1-SO$_3$H. However, if cooperative interactions significantly enhance the adsorption enthalpy, the opposite would be observed. Furthermore, this would strongly suggest that a cooperative interaction between individual polymer networks is possible, given the para substitution in these particular materials. Additionally, if the interaction is between polymer networks, then the packing effects that are suggested by differences in pore size distribution should also affect ammonia uptake.

Figure 9A:
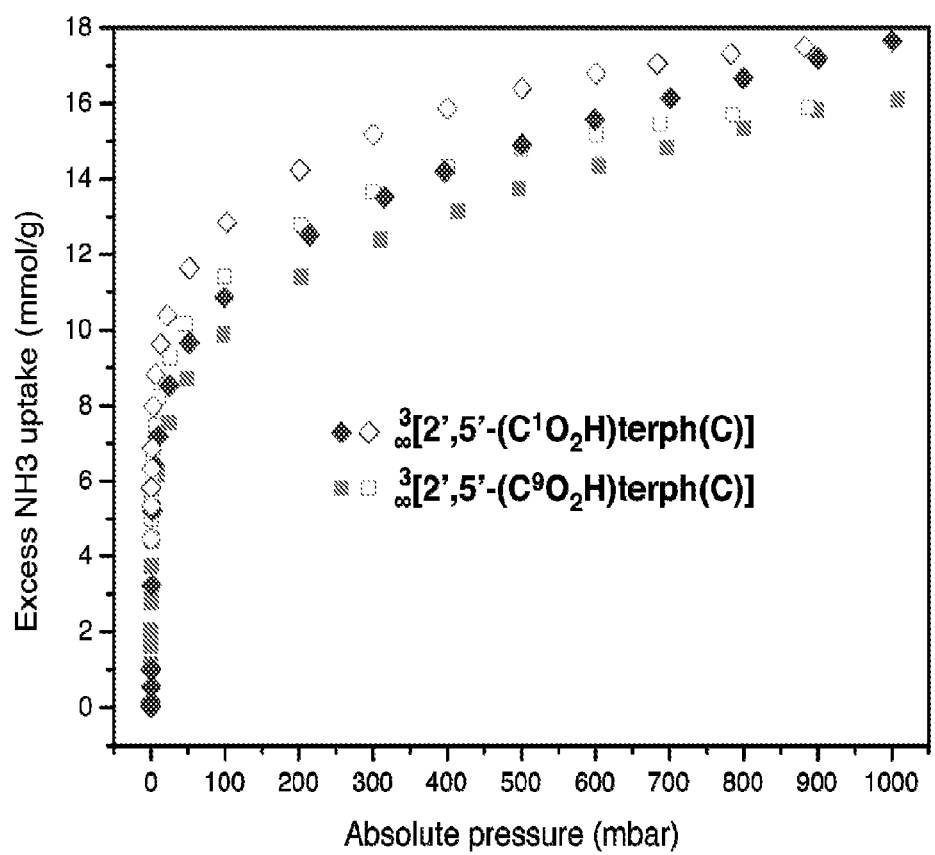
FIG. 9A and FIG. 9B. Room temperature (298 K) ammonia adsorption for terephthalic acid based porous aromatic polymers. Acid derived from methyl ester $_\infty^3[2,5'-(C^1O_2H)terph(C)]$ (◇, ♦). Acid derived from 1-nonyl ester $_\infty^3[2,5'-(C^9O_2H)terph(C)]$ (□, ■). Open circles represent desorption data.
Figure 9B:
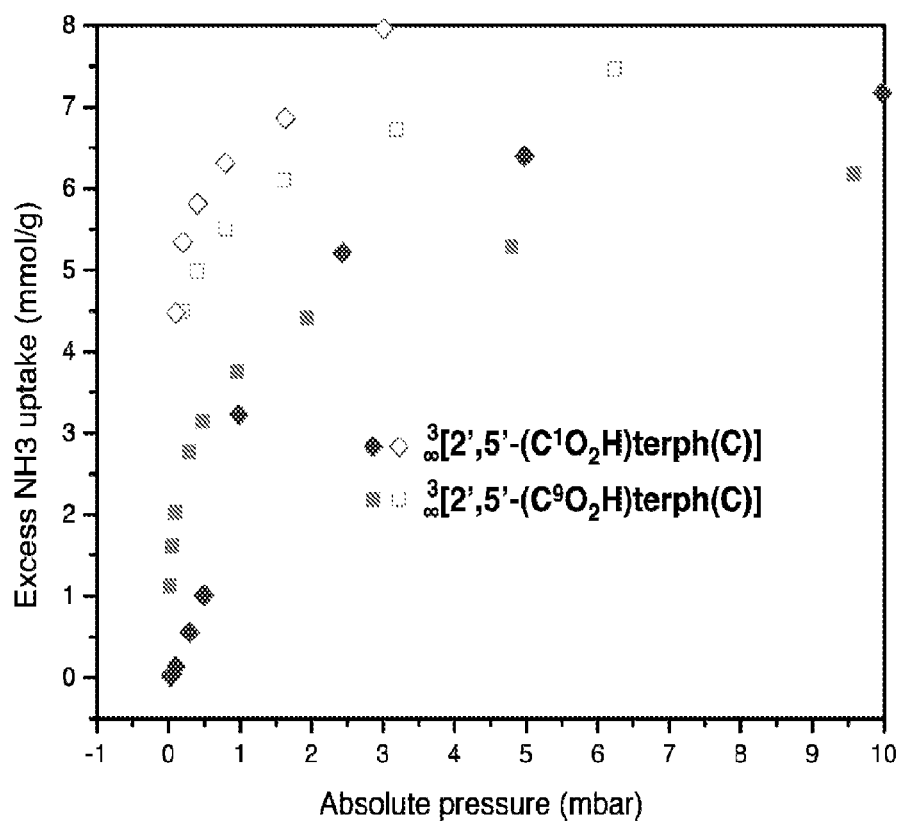
Figure 10:
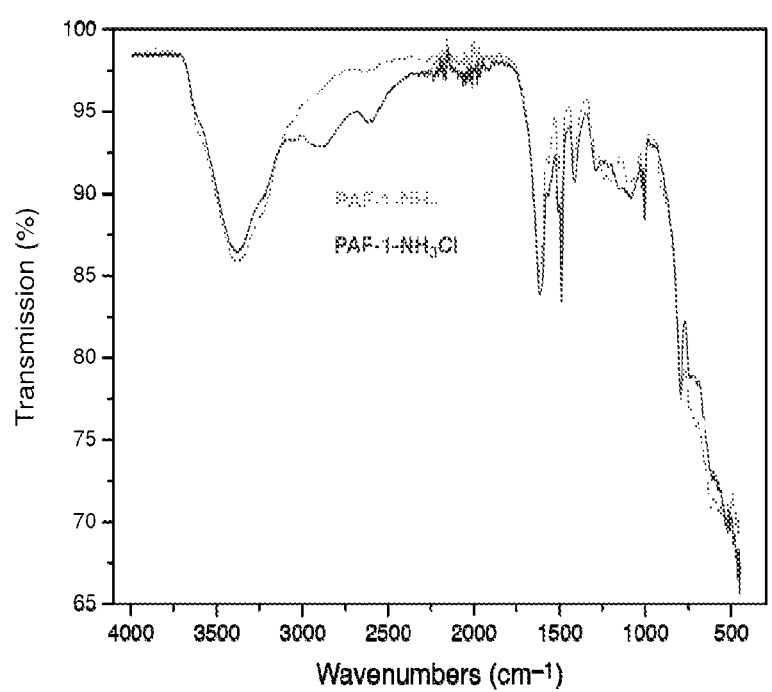
FIG. 10. Infrared monitoring for conversion of PAF-1-$NH_2$ to PAF-1-$NH_3Cl$.
Figure 11:
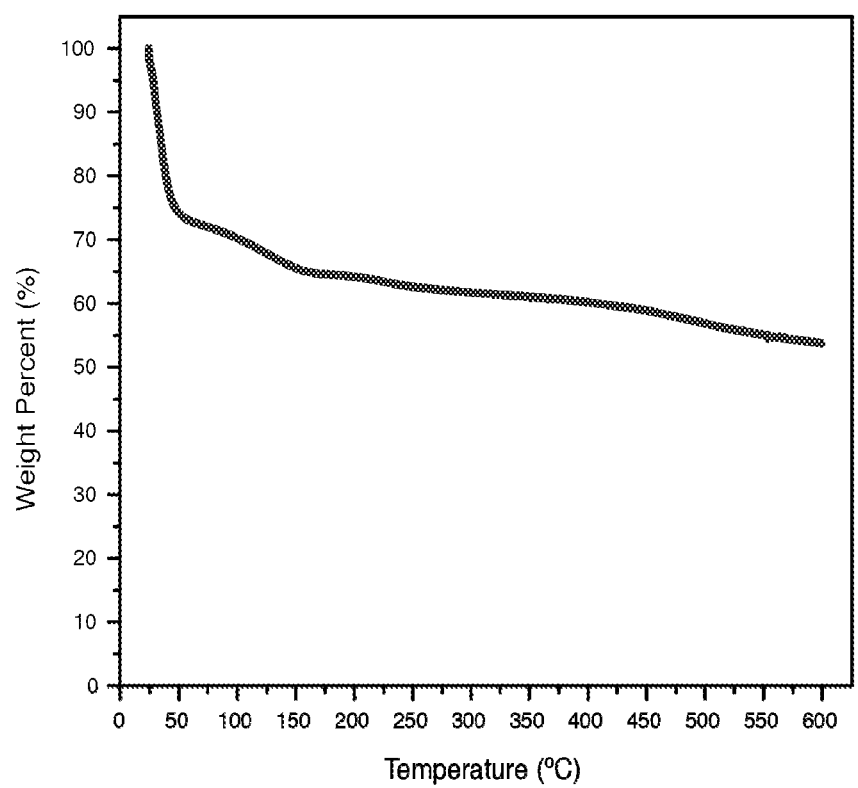
FIG. 11. Thermal gravimetric analysis of PAF-1-$NH_3Cl$.
Figure 12:
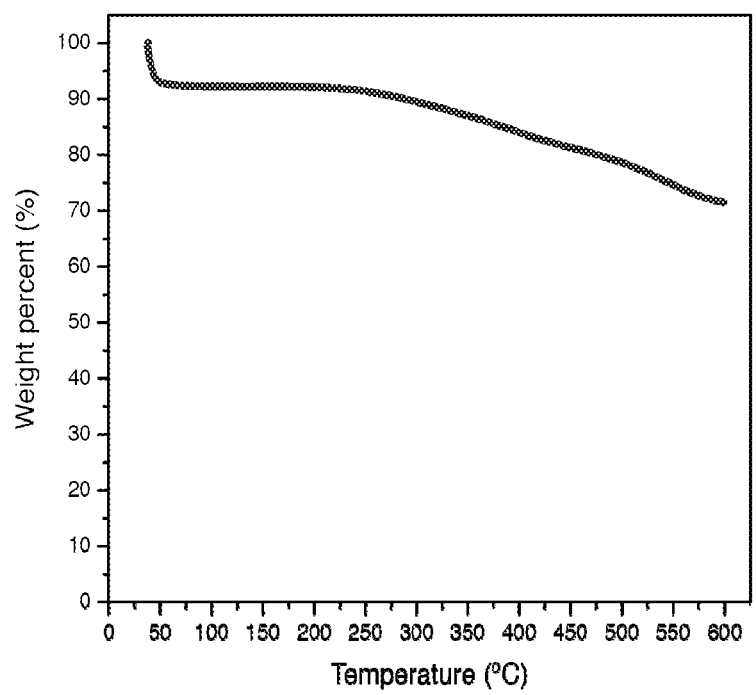
FIG. 12. Thermal gravimetric analysis of $_\infty^3[2,2'-(CHO)biph(Si)]$.
Figure 13:
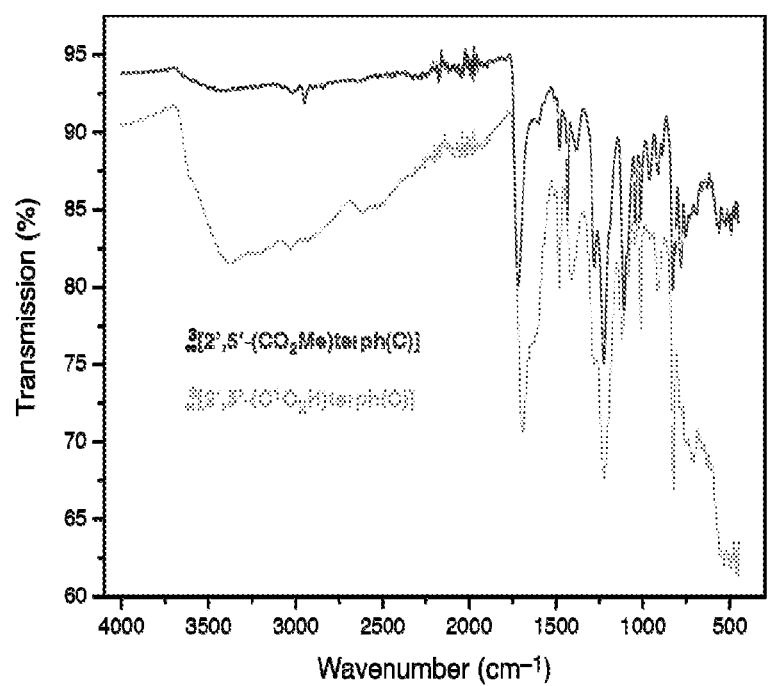
FIG. 13. Infrared analysis of KOH/DMSO side-chain cleavage to $_\infty^3[2',5'-(C^1O_2H)terph(C)]$.
Figure 14:
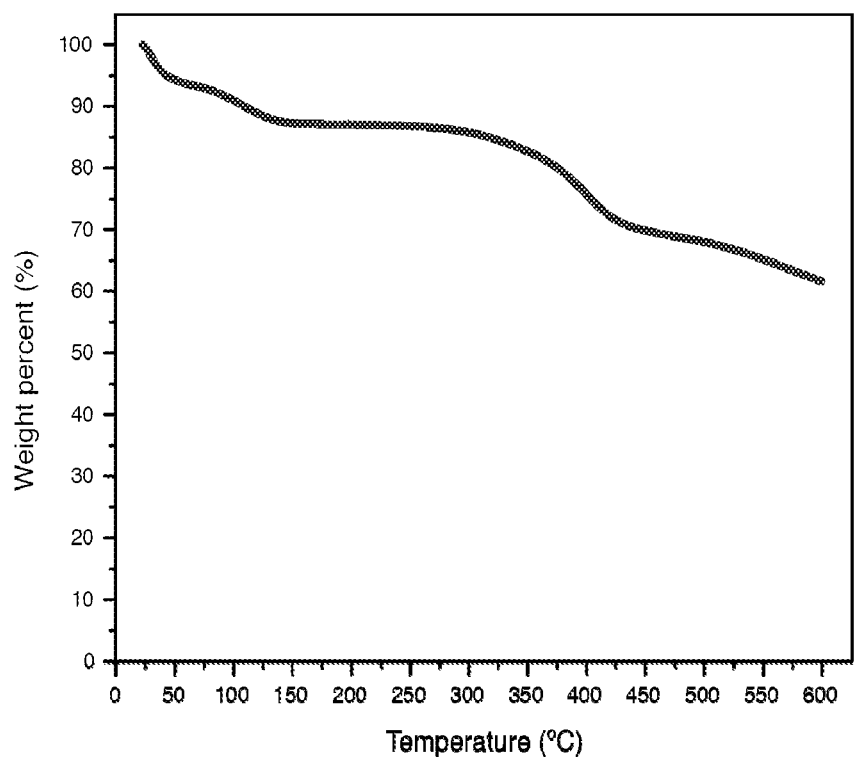
FIG. 14. Thermal gravimetric stability analysis of $_\infty^3[2',5'-(C^1O_2H)terph(C)]$.
Figure 15:
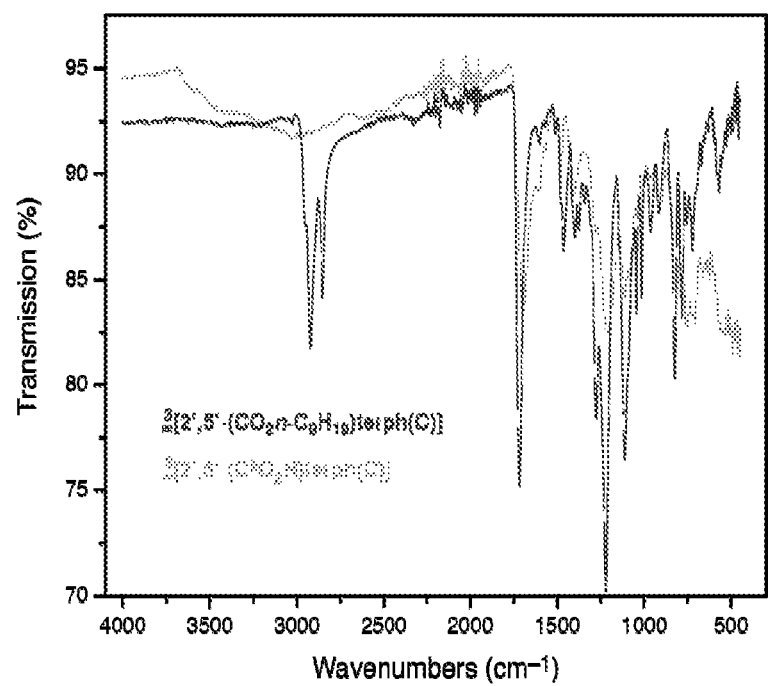
FIG. 15. Infrared analysis of KOH/DMSO side-chain cleavage to $_\infty^3[2',5'-(C^9O_2H)terph(C)]$.
Figure 16:
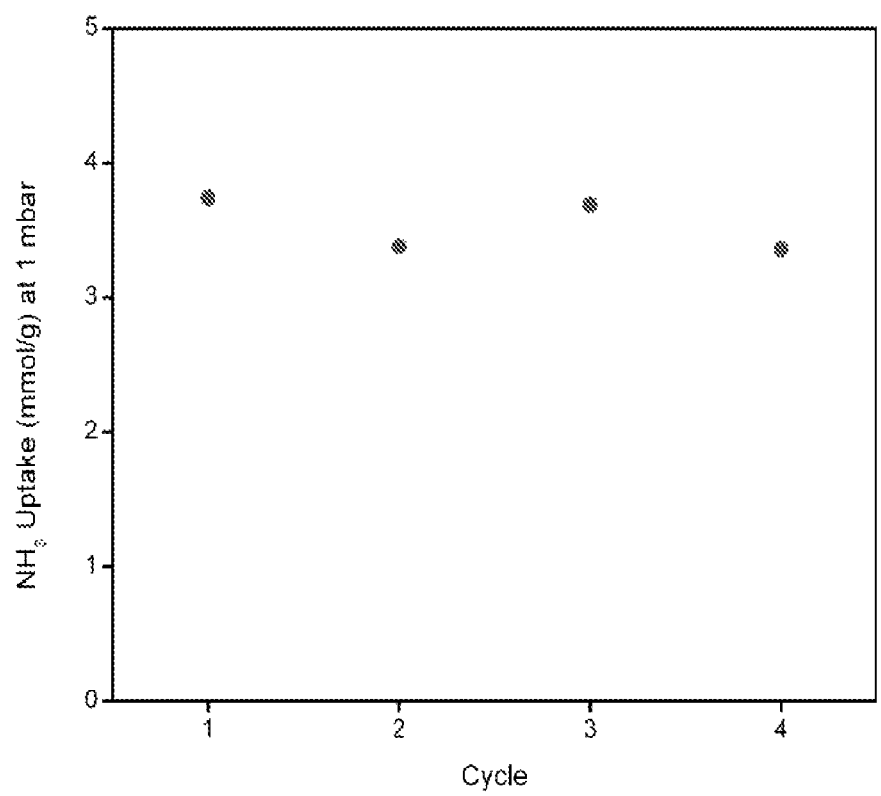
FIG. 16. Room temperature ammonia uptake of $_\infty^3[2',5'-(C^1O_2H)terph(C)]$ at 1 mbar over 4 cycles after regenerating the polymer at 130° C. before each run.

Ammonia adsorption data for these materials are shown in FIGS. 9A-9B. Significant differences can be observed at both low and high pressure. Additional information that can be gathered from including desorption data indicates that kinetics effects cannot be ignored in these materials. Even with extended equilibration times, $_\infty^3$[2',5'-(C$^1$O$_2$H)terph(C)] displays lower uptake at and below 1 mbar, yet retains more ammonia at these pressures upon desorption. This strongly suggests that there is a difference in kinetics resulting from the differing pore size distributions. Very small pores—potentially, even below our limit of detection with N$_2$ adsorption analysis—are difficult to access, and as such, adsorption does not occur on a reasonable timescale until higher pressures are applied. At 1000 mbar, $_\infty^3$[2',5'-(C$^1$O$_2$H)terph(C)] does display a meaningful increase over $_\infty^3$[2',5'-(C$^9$O$_2$H)terph(C)] (17.7 mmol/g C$^1$ vs. 16.1 mmol/g C$^9$). Upon desorption, the higher fraction of very small pore binding sites in $_\infty^3$[2',5'-(C$^1$O$_2$H)terph(C)] leads to greater amounts of residual adsorption (4.5 mmol/g at 204 ppm desorption for C$^9$ vs 5.3 mmol/g at 203 ppm for C$^1$).

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A porous aromatic polymer comprising a first three-dimensional repeat unit according to Formula I:

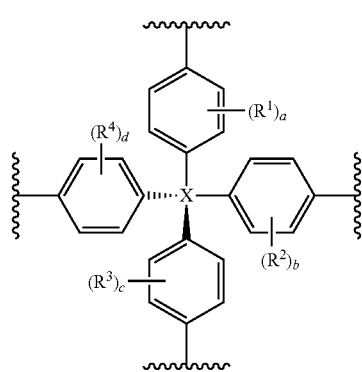

(I)

wherein
X is selected from C, Si, and a three-dimensional polycyclic cycloalkyl moiety;
R$^1$, R$^2$, R$^3$ and R$^4$ are independently selected from H, substituted or unsubstituted alkyl, substituted or unsubstituted heteroalkyl, substituted or unsubstituted aryl, substituted or unsubstituted heteroaryl, halogen, CN, CF$_3$, acyl, —SO$_2$NR$^6$R$^7$, —NR$^6$R$^7$, —OR$^6$, —S(O)$_2$R$^6$, —C(O)R$^6$, —COOR$^6$, —CONR$^6$R$^7$, —S(O)$_2$OR$^6$, —OC(O)R$^6$, —C(O)NR$^6$R$^7$, —NR$^6$C(O)R$^7$, NR$^6$C(O)NR$^7$R$^8$, C(NR$^6$)R$^7$, —NR$^6$SO$_2$R$^7$, —NO$_2$, and —P(O)(OR$^6$)(OR$^7$), wherein two or more of R$^1$, R$^2$, R$^3$, and R$^4$, together with the atoms to which they are bonded, are optionally joined to form a ring system which is a member selected from substituted or unsubstituted cycloalkyl, substituted or unsubstituted heterocycloalkyl, substituted or unsubstituted aryl and substituted or unsubstituted heteroaryl,
wherein
R$^6$, R$^7$, and R$^8$ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl, and two or more of R$^6$, R$^7$, and R$^8$, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl; and
the indices a, b, c and d are members independently selected from the integers 0, 1, 2, 3, and 4, such that when a, b, c, or d is greater than 1, each R$^1$, R$^2$, R$^3$ and R$^4$, respectively, is independently selected; and
a second repeat unit according to Formula II:

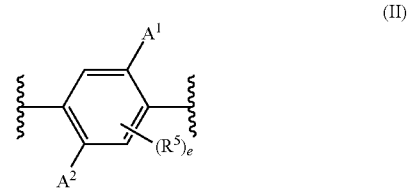

(II)

wherein
A$^1$ and A$^2$ are independently selected Brønsted acid moieties;
R$^5$ is a member selected from H, substituted or unsubstituted alkyl, substituted or unsubstituted heteroalkyl, substituted or unsubstituted aryl, substituted or unsubstituted heteroaryl, halogen, CN, CF$_3$, acyl, —SO$_2$NR$^9$R$^{10}$, —NR$^9$R$^{10}$, —S(O)$_2$R$^9$, —C(O)R$^9$, —COOR$^9$, —CONR$^9$R$^{10}$, —S(O)$_2$OR$^9$, —OC(O)R$^9$, —C(O)NR$^9$R$^{10}$, —NR$^9$C(O)R$^{10}$, NR$^9$C(O)NR$^{10}$R$^{11}$, C(NR$^9$)R$^{10}$, —NR$^9$SO$_2$R$^{10}$, —NO$_2$, and —P(O)(OR$^9$)(OR$^{10}$), wherein
R$^9$, R$^{10}$, and R$^{11}$ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl, and two or more of R$^9$, R$^{10}$, and R$^{11}$, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl; and
e is an integer selected from 0, 1, 2, 3, and 4, such that when e is greater than 1, each R$^5$ is independently selected, and said first three-dimensional repeat unit and said second repeat unit are covalently bound in said porous aromatic polymer.

2. A porous aromatic copolymer comprising at least a first repeat unit according to Formula III:

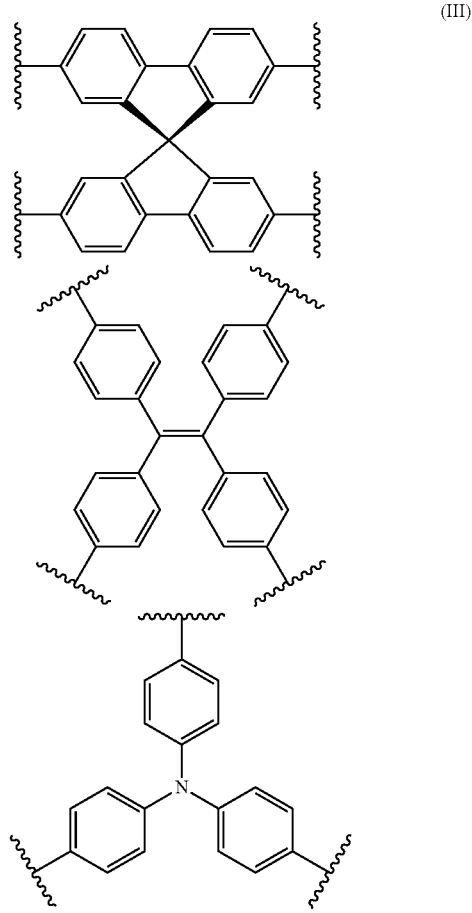

(III)

and a second repeat unit according to Formula II:

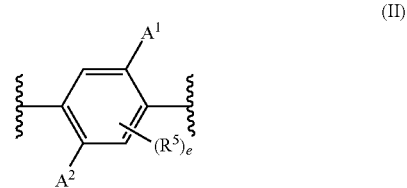

(II)

wherein
A¹ and A² are independently selected Brønsted acid moieties;
R⁵ is a member selected from H, substituted or unsubstituted alkyl, substituted or unsubstituted heteroalkyl, substituted or unsubstituted aryl, substituted or unsubstituted heteroaryl, halogen, CN, CF₃, acyl, —SO₂NR⁹R¹⁰, —NR⁹R¹⁰, —OR⁹, —S(O)₂R⁹, —C(O)R⁹, —COOR⁹, —CONR⁹R¹⁰, —S(O)₂OR⁹, —OC(O)R⁹, —C(O)NR⁹R¹⁰, —NR⁹C(O)R¹⁰, NR⁹C(O)NR¹⁰R¹¹, C(NR⁹)R¹⁰, —NR⁹SO₂R¹⁰, —NO₂, and —P(O)(OR⁹)(OR¹⁰), wherein
R⁹, R¹⁰, and R¹¹ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl, and two or more of R⁹, R¹⁰, and R¹¹, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl; and
e is an integer selected from 0, 1, 2, 3, and 4, such that when e is greater than 1, each R⁵ is independently selected,
and said first repeat unit and said second repeat unit are covalently bound in said copolymer.

3. The porous aromatic polymer according to claim 1, wherein each said A¹ and A² group is a member independently selected from carboxylic acid, sulfonic acid, phosphonic acid, hydroxyl, and quaternary amine.

4. The porous aromatic polymer according to claim 1, wherein the first three-dimensional repeat unit according to Formula I has the structure:
X is C; R¹, R², R³, and R⁴ are each H; a, b, c, and d are each 4; and the second repeat unit according to Formula II has the structure:
A¹, and A² are each COOH; R⁵ is H; and e is 2.

5. A porous aromatic polymer comprising a first three-dimensional repeat unit according to Formula I:

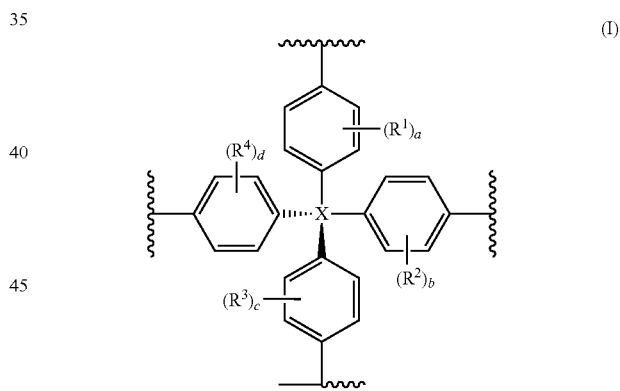

(I)

wherein
X is selected from C, Si, and a three-dimensional polycyclic cycloalkyl moiety;
R¹, R², R³ and R⁴ are independently selected from H, substituted or unsubstituted alkyl, substituted or unsubstituted heteroalkyl, substituted or unsubstituted aryl, substituted or unsubstituted heteroaryl, halogen, CN, CF₃, acyl, —SO₂NR⁶R⁷, —NR⁶R⁷, —OR⁶, —S(O)₂R⁶, —C(O)R⁶, —COOR⁶, —CONR⁶R⁷, —S(O)₂OR⁶, —OC(O)R⁶, —C(O)NR⁶R⁷, —NR⁶C(O)R⁷, NR⁶C(O)NR⁷R⁸, C(NR⁶)R⁷, —NR⁶SO₂R⁷, —NO₂, and —P(O)(OR⁶)(OR⁷),
wherein two or more of R¹, R², R³, and R⁴, together with the atoms to which they are bonded, are optionally joined to form a ring system which is a member selected from substituted or unsubstituted cycloalkyl, substituted or unsubstituted heterocycloalkyl, substituted or unsubstituted aryl and substituted or unsubstituted heteroaryl,
wherein
R⁶, R⁷, and R⁸ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl, and two or more of R⁶, R⁷, and R⁸, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl; and
the indices a, b, c and d are members independently selected from the integers 0, 1, 2, 3, and 4, such that when a, b, c, or d is greater than 1, each R¹, R², R³ and R⁴, respectively, is independently selected; and
a second repeat unit according to Formula II:

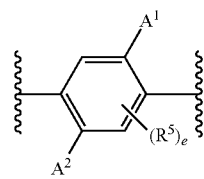

(II)

wherein
A¹ and A² are independently selected Brønsted acid moieties;
R⁵ is a member selected from H, substituted or unsubstituted alkyl, substituted or unsubstituted heteroalkyl, substituted or unsubstituted aryl, substituted or unsubstituted heteroaryl, halogen, CN, CF₃, acyl, —SO₂NR⁹R¹⁰, —NR⁹R¹⁰, —OR⁹, —S(O)₂R⁹, —C(O)R⁹, —COOR⁹, —CONR⁹R¹⁰, —S(O)₂OR⁹, —OC(O)R⁹, —C(O)NR⁹R¹⁰, —NR⁹C(O)R¹⁰, NR⁹C(O)NR¹⁰R¹¹, C(NR⁹)R¹⁰, —NR⁹SO₂R¹⁰, —NO₂, and —P(O)(OR⁹)(OR¹⁰), wherein
R⁹, R¹⁰, and R¹¹ are members independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl, and two or more of R⁹, R¹⁰, and R¹¹, together with the atoms to which they are bonded, are optionally joined to form a 5- to 7-membered ring which is a member selected from substituted or unsubstituted cycloalkyl, substituted or unsubstituted heterocycloalkyl, substituted or unsubstituted aryl and substituted or unsubstituted heteroaryl; and
e is an integer selected from 0, 1, 2, 3, and 4, such that when e is greater than 1, each R⁵ is independently selected,
and said first three-dimensional repeat unit and said second repeat unit are covalently bound in said porous aromatic polymer, further comprising bound thereto a nitrogenous species having the formula:

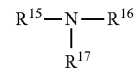

wherein
R¹⁵, R¹⁶ and R¹⁷ are independently selected from H, substituted or unsubstituted alkyl, substituted or unsubstituted heteroalkyl, substituted or unsubstituted aryl, substituted or unsubstituted heteroaryl, and substituted or unsubstituted heterocycloalkyl, wherein said nitrogenous species is optionally quaternized by at least one of said Brønsted acid moieties.

6. The porous aromatic polymer according to claim 5, wherein said nitrogenous species is quaternized by at least one of said Brønsted acid moieties.

7. The porous aromatic polymer according to claim 5, wherein said nitrogenous species is bound to said porous aromatic polymer by two or more of said Brønsted acid moieties.

8. The porous aromatic polymer according to claim 1, wherein said porous aromatic polymer has a 3-dimensional structure that is morphologically stable under conditions selected from strong acid, strong base, high-temperature and a combination thereof.

9. A method of scouring a nitrogenous species from the ambient environment, said method comprising:
(a) adsorbing said nitrogenous species on said porous aromatic polymer according to claim 1, thereby scouring said nitrogenous species from said ambient environment.

10. The method according to claim 9, wherein said adsorbing occurs at an ambient pressure of about 1 atmosphere or lower.

11. The method according to claim 10, further comprising:
(b) regenerating said porous aromatic polymer by submitting the product of (a) to at least one cycle of higher than ambient heat or pressure lower than ambient pressure, thereby desorbing said nitrogenous species from said porous aromatic polymer.

* * * * *